United States Patent
Geller et al.

(10) Patent No.: US 8,447,829 B1
(45) Date of Patent: May 21, 2013

(54) SYSTEM AND METHOD FOR CONTROLLING ACCESS TO WEB SERVICES RESOURCES

(75) Inventors: Alan S. Geller, Redmond, WA (US); Rahul Singh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1634 days.

(21) Appl. No.: 11/351,904

(22) Filed: Feb. 10, 2006

(51) Int. Cl.
*G06F 15/173* (2006.01)

(52) U.S. Cl.
USPC .......................................... 709/217

(58) Field of Classification Search
USPC .................. 709/220, 222, 223, 225; 707/1, 2, 707/9; 726/1, 2, 3, 4, 16, 17, 21
See application file for complete search history.

(56) References Cited

U.S. PATENT DOCUMENTS

| | | | |
|---|---|---|---|
| 5,812,773 A | 9/1998 | Norin | |
| 5,878,409 A | 3/1999 | Baru et al. | |
| 6,314,434 B1 | 11/2001 | Shigemi et al. | |
| 6,418,450 B2 | 7/2002 | Daudenarde | |
| 6,463,454 B1 | 10/2002 | Lumelsky et al. | |
| 6,714,778 B2 | 3/2004 | Nykanen et al. | |
| 6,721,746 B2 * | 4/2004 | Zulpa et al. ..................... 707/10 | |
| 6,772,159 B1 | 8/2004 | Blount et al. | |
| 6,792,605 B1 | 9/2004 | Roberts et al. | |
| 7,076,558 B1 | 7/2006 | Dunn | |
| 7,124,192 B2 | 10/2006 | High, Jr. et al. | |
| 7,178,163 B2 | 2/2007 | Reeves, Jr. | |
| 7,207,067 B2 | 4/2007 | Feng et al. | |
| 7,254,685 B1 | 8/2007 | Cardente | |
| 7,272,613 B2 | 9/2007 | Sim et al. | |
| 7,370,351 B1 * | 5/2008 | Ramachandran et al. ........ 726/8 |
| 2001/0044879 A1 | 11/2001 | Moulton et al. | |
| 2002/0061070 A1 | 5/2002 | Cameron et al. | |
| 2002/0169986 A1 * | 11/2002 | Lortz ............................. 713/201 |
| 2003/0195987 A1 | 10/2003 | Krishnamurthy et al. | |
| 2003/0229812 A1 * | 12/2003 | Buchholz ....................... 713/202 |
| 2004/0128442 A1 | 7/2004 | Hinshaw et al. | |
| 2004/0167984 A1 | 8/2004 | Herrmann | |
| 2004/0215749 A1 * | 10/2004 | Tsao ............................. 709/220 |
| 2005/0086228 A1 | 4/2005 | Gross et al. | |
| 2005/0125418 A1 | 6/2005 | Brewer et al. | |
| 2005/0267772 A1 | 12/2005 | Nielsen et al. | |

(Continued)

OTHER PUBLICATIONS

U.S. Appl. No. 11/352,461, filed Feb. 10, 2006.

(Continued)

*Primary Examiner* — Scott Christensen
(74) *Attorney, Agent, or Firm* — Robert C. Kowert; Meyertons, Hood, Kivlin, Kowert & Goetzel, P.C.

(57) ABSTRACT

A system and method for controlling access to web services resources. A system may include a storage medium configured to store instructions and one or more processors configured to access the storage medium. The instructions may be executable by at least one of the processors to implement a web services access control system (ACS) configured to receive requests. Each request specifies an access operation to be performed with respect to a corresponding resource. Each of the requests is associated with a corresponding principal. For each received request, the ACS may be further configured to determine whether an access control entry exists that is associated with both the resource and principal associated with the request and that specifies an access type sufficient to perform the access operation. If no such entry exists, the ACS may deny the request.

48 Claims, 14 Drawing Sheets

U.S. PATENT DOCUMENTS

| | | |
|---|---|---|
| 2006/0020585 A1 | 1/2006 | Harvey et al. |
| 2006/0059252 A1* | 3/2006 | Tatsubori et al. ............. 709/223 |
| 2006/0112084 A1 | 5/2006 | McBeath et al. |
| 2006/0161554 A1 | 7/2006 | Lucovsky et al. |
| 2007/0061266 A1 | 3/2007 | Moore et al. |
| 2007/0100834 A1 | 5/2007 | Landry et al. |
| 2007/0112578 A1 | 5/2007 | Randle et al. |
| 2007/0277043 A1 | 11/2007 | Sorensen |

OTHER PUBLICATIONS

U.S. Appl. No. 11/371,304, filed Mar. 8, 2006.
U.S. Appl. No. 11/370,353, filed Mar. 8, 2006.
U.S. Appl. No. 11/370,562, filed Mar. 8, 2006.
U.S. Appl. No. 11/371,263, filed Mar. 8, 2006.
U.S. Appl. No. 11/370,664, filed Mar. 8, 2006.
U.S. Appl. No. 11/511,076, filed Aug. 28, 2006.
Agarwal. et al., "Credential Based Access Control for Semantic Web Services," AAAI Spring Symposium, 2004.
Ryutov, et al., "Integrated Access Control and Intrusion Detection for Web Servers," IEEE Transactions on Parallel and Distributed Systems, Sep. 2003.
Hupfeld, "Log-Structured Storage for Efficient Weakly-Connected Replication," Proceedings of the 24th International Conference on Distributed Computing Systems Workshops, 2004 (ICDCSW'04).

* cited by examiner

| Resource table 300 | | | |
|---|---|---|---|
| Resource URI 320 | Principal ID 330 | Subject pool 340 | Access type 350 |
| URI A | Pat | Admin | FullControl |
| URI B | Alex | Customer | Read |
| URI C | John | Customer | Write |
| URI D | Cynthia | Customer | Read |

| Dataview 300a | | | |
|---|---|---|---|
| Principal ID 330 | Resource URI 320 | Subject pool 340 | Access type 350 |
| Alex | URI B | Customer | Read |
| Cynthia | URI D | Customer | Read |
| John | URI C | Customer | Write |
| Pat | URI A | Admin | FullControl |

FIG. 11

Resource table 300

| Resource URI 320 | Principal ID 330 | Subject pool 340 | Access type 350 | Record ID 360 | Delete flag 370 | Timestamp 380 |
|---|---|---|---|---|---|---|
| URI A | Pat | Admin | FullControl | 15A6 | 0 | 01568 |
| URI B | Alex | Customer | Read | 39892 | 0 | 18173 |
| URI C | John | Customer | Write | 08FD | 0 | 610273 |
| URI D | Cynthia | Customer | Read | 138 | 0 | 42191 |

FIG. 14

Resource table 300

| Resource URI 320 | Principal ID 330 | Subject pool 340 | Access type 350 | Record ID 360 | Delete flag 370 | Timestamp 380 |
|---|---|---|---|---|---|---|
| URI C | James | Customer | Read | 08FD | 0 | 265983 |
| URI C | John | Customer | Read | 08FD | 0 | 329649 |
| URI C | John | Customer | Write | 08FD | 0 | 610273 |
| URI E | Frank | Customer | Read | 5243 | 0 | 3920 |
| URI E | Frank | Customer | Read | 5243 | 1 | 11520 |

FIG. 15

SYSTEM AND METHOD FOR CONTROLLING ACCESS TO WEB SERVICES RESOURCES

BACKGROUND OF THE INVENTION

1. Field of the Invention

This invention relates to computer security and, more particularly, to techniques for controlling access to web services resources.

2. Description of the Related Art

The Internet and its associated communication protocols and infrastructure enable sophisticated information exchange to occur irrespective of the locations of the participants. As access to the public Internet continues to proliferate, and as Internet protocols become increasingly common for information exchange within private networks (intranets), techniques for implementing various computing applications and services in a distributed fashion continue to evolve.

In the web services model of computing, an entity may make some sort of computational service available to users through an interface using web-based Internet protocols such as the Hypertext Transport Protocol, for example. Thus, instead of simply presenting relatively static read-only data such as web pages to a user, an entity may employ similar techniques to implement more sophisticated services as web services. For example, a generic data storage service may be presented to users as a web service. Using appropriate web services protocols, users with Internet access may be able to store data objects to the data storage service and later access them from any location.

The web services approach may facilitate the presentation of services or data to large numbers of users in a location- and platform-independent fashion. However, it may not be desirable to allow all users equal access to all services or data. For example, a user that stores persistent state information (e.g., a data object) via a web service may wish to restrict other users from reading or modifying the stored information. Similarly, an entity offering a web service may wish to offer different levels of service to different users, for example on the basis of a user's willingness to pay for a given level of service.

Existing techniques for managing control of access to web services resources may generally lack in sophistication. Such existing techniques may typically distinguish user privileges at the domain level, offering or denying a user access to all services offered through a particular web domain or high-level address based on user authentication. Under such techniques, it may be difficult to distinguish web services resources at finer levels of granularity, such as the level of an individual object or other web services resource.

Management of web services access control information at finer levels of granularity may also create data management challenges, particularly for large-scale web services implementations. For example, in systems with many different users and web services resources to be managed, a considerable quantity of access control data may need to be generated, stored, and selectively retrieved in order to enforce the desired access control policies. Such data management tasks may impact the overall performance of the services offered, for example if completion of a web services request is dependent upon retrieval and evaluation of relevant access control data.

SUMMARY

Various embodiments of a system and method for controlling access to web services resources are disclosed. According to one embodiment, a system may include a storage medium configured to store instructions and one or more processors configured to access the storage medium. The instructions may be executable by at least one of the processors to implement a web services access control system, which may be configured to receive requests each specifying one or more access operations to be performed with respect to a corresponding web services resource, where each of the requests is associated with a corresponding one of one or more principals. For each received request, the web services access control system may be further configured to determine whether an access control entry exists that is associated with both the web services resource corresponding to the received request and the corresponding principal associated with the received request, and that specifies one or more access types, wherein the one or more access types are sufficient to perform the one or more access operations specified by the received request. In response to determining that such an access control entry does not exist for a given received request, the web services access control system may be further configured to deny the given received request.

According to another embodiment, a system may include a web services interface configured to receive a web services request from a web services client, where the web services request specifies a principal, a web services resource, and an access operation requested to be performed with respect to the web services resource on behalf of the principal. The system may further include a web services access control system that is configured to receive the web services request from the web services interface and in response to receiving the web services request, determine whether the principal has sufficient access privileges to perform the access operation with respect to the web services resource. The web services access control system may be further configured to return an indication to the web services client of whether or not the principal has sufficient access privileges to perform the access operation with respect to the web services resource.

BRIEF DESCRIPTION OF THE DRAWINGS

FIG. 5 illustrates one embodiment of a packing slip that may be included in a package resulting from the order fulfillment method of FIG. 4.

FIG. 11 illustrates one example of a table and a corresponding dataview.

FIG. 14 illustrates one example of a table augmented with metadata.

FIG. 15 illustrates one example of a table including entries corresponding to structured data records that have been updated or deleted.

Figure 1:
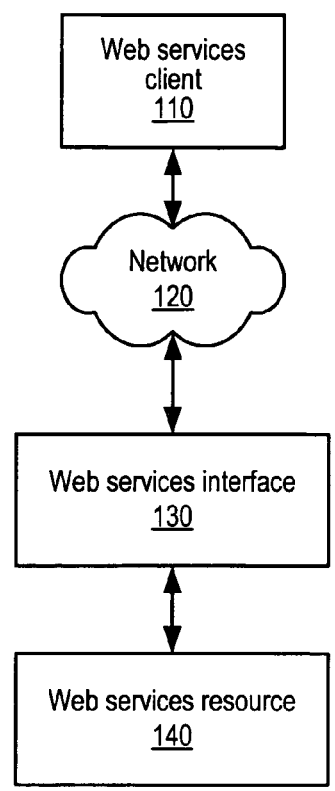
FIG. 1 is a block diagram illustrating one embodiment of a web services architecture.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

The evolution of web services as a model for offering computational services to users depends on the extension of the web services model to offer data security appropriate to the resources being offered. In conventional approaches, web services security typically relies on user authentication. Such authentication often relies on user identity information independent of the specific service or resource requested by a user, granting or denying access to large groups of services on the basis of a given user's credentials. However, as web services evolve to offer persistent data services such as object storage, queue management, account management and other services, the question of access privileges increasingly depends on the intersection of users and specific resources. For example, a user that owns a particular data object stored via a web services data storage system may wish to grant specified types of access to that particular data object to some users but not others. Further, the same user may wish to grant a different set of access privileges with respect to a different data object. To support such flexibility in granting access to resources, a model of web services access control may take into account user information in conjunction with access properties associated with those resources.

In the following discussion, an access control system is first described. In various embodiments, the access control system may be configured to store and retrieve access control information associated with web services resources, where for a particular web services resource, the access control information may include information identifying a particular user or principal as well as information identifying the access privileges held by the principal with respect to the particular web services resource. The access control system may be configured to use such access control information to determine whether a request to perform an access operation on a given web services resource on behalf of a given principal should be allowed to proceed.

In instances where the access control system supports many different principals and web services resources, a considerable quantity of access control information may be generated. Performance of the access control system may depend on the access control information being reliably stored, so as to minimize the risk of loss of data, and readily available. For example, in embodiments where the access control system is physically distributed across geographically dispersed sites, storing a single copy of access control information at one site may slow overall system performance relative to distributing copies of access control information among various sites. Following discussion of the access control system, a distributed storage system configured to replicate and distribute storage of structured data records indicative of access control information among a number of storage nodes is described.

Overview of Web Services System Architecture

As mentioned previously, many different types of applications, functions or services may be implemented as web services. Generally speaking, implementing a function or service as a web service may encompass providing any of a variety of standardized application programming interfaces (APIs) configured to allow different software programs to communicate (e.g., to request services and respond to such requests) in an autonomous, web-based and typically platform-independent manner. Through a web services API, a web services client may submit a web services request to a web services host or provider, which may responsively process the request and return appropriate results to the client as defined by the web services API. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external clients via a web services interface. Client applications could then access the exposed data and/or functions via the web services interface, even though the accessing application may be configured to execute on an entirely different platform (e.g., a different operating system or system architecture) than the platform hosting the exposed data or functions.

One example of a high-level web services system architecture is shown in FIG. 1. In the illustrated embodiment, a web services client 110 may be configured to communicate via a network 120 with a web services interface 130 in order to submit web services requests directed to a web services resource 140. Generally speaking, web services client 110 (or simply, client 110) may correspond to any application or program configured to generate and convey a web services request to web services interface 130 (or simply, interface 130) using one or more suitable protocols, such as those described below. While in some embodiments, web services client 110 may correspond to a web browser or other application that may provide a user with direct access to various Internet-based resources, in other embodiments web services client 110 may be transparently embedded within another application or an operating system. As an example, in one embodiment a data storage web service may be employed to provide data storage for an office application such as a word processor or spreadsheet. In such an embodiment, web services client 110 may be integrated within the office application or the operating system on which the application executes, such that user requests to store data may be processed by client 110 to generate web services requests directed to the data storage service. In some such embodiments, the user may be unaware of underlying web services activity. For example, from the user's perspective, the web services-implemented data storage may be indistinguishable from local storage (e.g., a disk drive local to the system employed by the user).

Network 120 may generally correspond to any type of communication network suitable for conveying web services traffic between client 110 and interface 130. For example, network 120 may include local area network (LAN) technology such as wired or wireless Ethernet technology, telecommunication network technology such as dial-up telephony, digital subscriber line (DSL) or cable modem networking, or any suitable combination of these or other technologies. In various embodiments, network 120 may correspond to a private network such as an enterprise intranet, a public network such as the public Internet, or a combination of the two.

Web services interface 130 may generally correspond to that functionality necessary to receive and process web services requests from clients such as client 110 and to direct the requests to the appropriate web services resources 140 referenced by the requests. In some embodiments, interface 130 may be configured to perform additional functions, such as authentication of user identity credentials (e.g., user ID and password authentication), load balancing or other suitable functions. In some embodiments, interface 130 may be configured to pass valid, authorized web services requests along to resources 140 in substantially the same format in which the request arrived (e.g., as an XML document, described below). In other embodiments, interface 130 may be configured to translate the request from the format of the web services API to the format of an API appropriate to the underlying resource 140.

In general, web services resource 140 (or simply, resource 140) may correspond to any uniquely identifiable web services endpoint. In some embodiments, resource 140 may be identified by a corresponding Uniform Resource Locator (URL) of the general format:
<protocol>://<host.domain>/<path>
where <protocol> specifies a transport protocol to be used to access the resource (e.g., HTTP or another suitable transport protocol), <host.domain> specifies the name or, alternatively, Internet Protocol (IP) numeric address of a host to which a web services request for the identified resource should be directed by the transport protocol, and <path> identifies the path to be resolved by the host to access the identified resource. One example of a URL corresponding to a resource 140 is: http://storage.host.com/smith/music/Artist/Album/Track1.mp3
In this example, the company host.com may provide a storage service accessible through the host storage.host.com. This host may maintain a namespace for resources distinguished by usernames, where the illustrated URL is associated with the user smith. User smith may further subdivide his portion of the resource namespace using an arbitrary number of levels of hierarchy that the host may navigate to access the resource, which in this case is an MP3 file.

It is noted that in some embodiments, a Uniform Resource Identifier (URI) of the general format may be used in place of a URL to identify a resource 140. Generally speaking, a URI may identify host, domain and path information associated with a resource 140 that may be sufficient to uniquely identify that resource within a particular naming scheme, or simply "scheme." A given scheme may correspond to a particular standard or specification for assigning identifiers within that scheme. Often, a scheme may specify rules of syntax for generation of well-formed identifiers within that scheme. A URI may have the general format:
<scheme>:<host.domain>/<path>
where host, domain and path may be as described above with respect to a URL. In some instances, the scheme of a URI for a resource may also correspond to a protocol that may be used to access the resource. In such cases, a URI may directly correspond to a (possibly identically formatted) URL. However, it is noted that different URLs may exist for a given URI. For example, a URI defined within an HTTP scheme may be accessed via a URL specifying the HTTP protocol, or via another URL specifying a different type of transport protocol, such as FTP. More information regarding resource naming using URIs and URLs may be found, e.g., in the Internet standards track protocol document entitled Request For Comments (RFC) 3986, or a suitable successor document.

A web services resource 140 may correspond to a data object, such as a file including audio, video, still image, text, executable code or any other suitable type of data. Generally speaking, a data object may have persistent content or state that may be stored, retrieved or modified as a result of a web services request. Typically, a data object resource may not perform a function other than to retain its state until its state is altered, for example by a suitable web services request. In other instances, a resource 140 may correspond to a service. In contrast to a data object, a service resource may be configured to take input data or parameters, perform some function, and return an output as a result or consequence of the function. For example, a service resource may be implemented as an application program or script, such as a Javascript module, that may execute some function in response to a web services request. In some cases, resources 140 may combine aspects of data object and service resources. For example, a queuing web service may allow users to establish and persistently store entries into queue resources, as well as to perform operations on established queues to transform their state.

It is noted that in some embodiments, client 110, interface 130 and resource 140 may denote any suitable configuration of computer system(s) or portions of computer systems configured to implement the respective functionality of these components. An exemplary embodiment of such a computer system is discussed below in conjunction with the description of FIG. 18. However, in such embodiments, it is noted that the illustrated partitioning of functionality need not map directly to a corresponding partitioning of computer systems. For example, in one embodiment interface 130 and resource 140 may be implemented by the same system. Alternatively, any of these components may be distributed for implementation across several distinct systems. It is also noted that while singular elements are shown in FIG. 1, the illustrated architecture may be extended to support arbitrary numbers of clients 110, networks 120, instances of interface 130 and resources 140, distributed across any suitable number of computer systems.

In some embodiments, provisioning a web service may encompass the use of particular protocols which may be executable, for example as part of interface 130, to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web service encompassing one or more resources 140 may register the service using a version of the Universal Discovery Description and Integration (UDDI) protocol, which may function as a general directory through which potential resource users may locate web services of interest. The web service provider may also publish specific details regarding how a well-formed web services request from a client 110 should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged between a client 110 and interface 130 through the use of messages or documents formatted as platform-independent structured data, such as a document formatted in compliance with a version of eXtensible Markup Language (XML). For example, in one embodiment, a web services resource 140 may be configured to provide inventory status information for items stored in inventory within a storage facility. A web services request to provide inventory status information for a given inventory item may be embodied in an XML document including fields identifying the item of interest, the type of data requested (e.g., inventory status data), and possibly other fields, in which each field is delimited by an XML tag describing the type of data the field represents. The response to such a request from interface 130 or the resource 140 may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in one embodiment web services requests or responses may be XML documents formatted according to a version of the SOAP protocol (some versions of which may also be known as Simple Object Access Protocol), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as components or elements of a transport protocol command in a REST-type architecture. Other suitable configurations of web services architectures are possible and contemplated.

Web Services Access Control System

Figures 2A, 3:
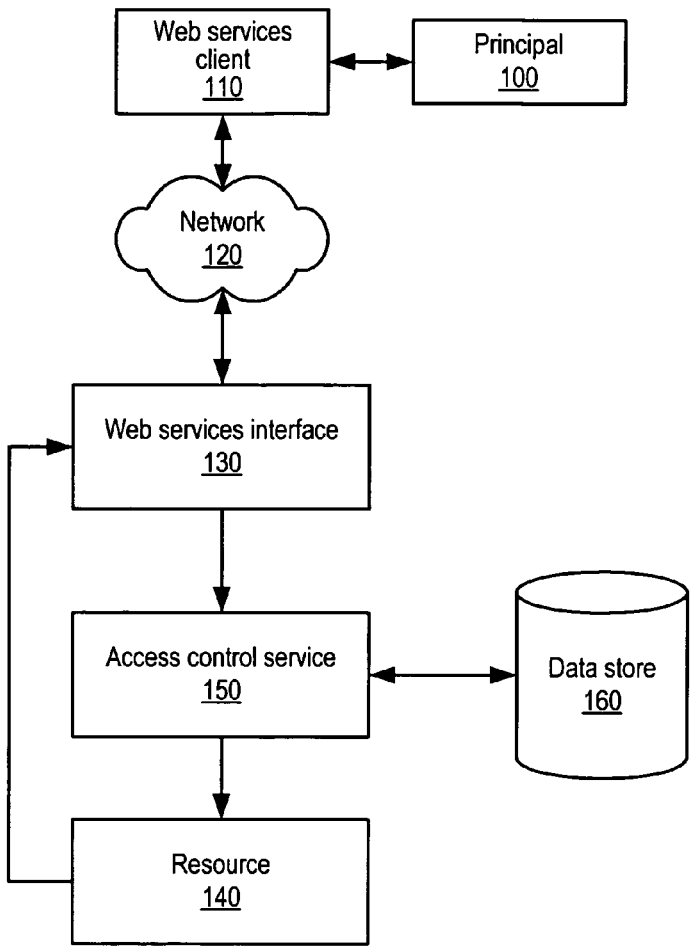
FIGS. 2A-C are block diagrams illustrating various embodiments of a web services architecture including an access control system.
FIG. 3 illustrates one embodiment of a table including access control entries corresponding to web services resources.

In some embodiments, the system architecture shown in FIG. 1 may be augmented to include components configured to provide a resource-based web services access control model. One such embodiment is shown in FIG. 2A, in which an access control service (ACS) 150 is interposed between web services interface 130 and a number of web services resources 140. ACS 150 may be configured to store and retrieve access control information within a data store 160, as described in greater detail below. Although a single instance of ACS 150 is shown, it is contemplated in some embodiments, that multiple instances of ACS 150 may be deployed in a distributed fashion, for example across computing resources located in different physical facilities.

In the illustrated embodiment, web services client 110 may be configured to submit web services requests directed to one or more resources 140 on behalf of a principal 100. Generally speaking, principal 100 may correspond to any uniquely identifiable entity that may be granted access privileges or rights with respect to a particular resource 140. For example, a principal 100 may correspond to an individual user. In some embodiments, web services client 110 may be configured to submit web services requests on behalf of multiple different principals 100, while in other embodiments there may exist a one-to-one corresponding between each instance of client 110 and each principal 100. The illustrated system may support an arbitrary number of principals 100 in addition to an arbitrary number of resources 140.

Each principal 100 may have an associated access identifier. In one embodiment, an access identifier of a principal 100 may include a tuple or concatenation of at least two components: a subject pool identifier that may unique identify one of several possible principal namespaces, and a principal ID that may uniquely identify the principal 100 within the namespace of a particular subject pool. For example, the subject pool may be configured to distinguish different business or other entities that manage or offer web services. In such an embodiment, different entities (e.g., different online merchants A and B) may independently authorize a principal 100 to access various web services, and each may assign a principal ID unique within their respective subject pools. Generally speaking, the components of an identifier associated with a principal 100 may be represented in any suitable format, such as a numerical or string format. It is noted that in embodiments in which a principal's access identifier includes a subject pool namespace, a single user that seeks to access resources 140 of entities corresponding to different subject pools may have multiple distinct access identifiers corresponding to the different subject pools. That is, in such embodiments, an individual user may correspond to multiple distinct principals 100 with respect to resources 140. In other embodiments, it is contemplated that principal access identifiers may be implemented as globally unique identifiers without using subject pool or other namespace identifiers. In some such embodiments, there may exist a one-to-one correspondence between individual users and principals 100.

Generally speaking, for a given request submitted on behalf of a principal 100 to perform a particular type of access operation with respect to a particular resource 140, ACS 150 may be configured to determine whether access control information associated with the principal 100 and the particular resource 140 indicates that the requested access operation is permissible. In one embodiment, such access control information may be formatted within a data structure referred to as an access control entry (ACE). ACS 150 may be configured to generate, evaluate and modify access control entries for resources 140 as well as to store and retrieve ACEs to and from data store 160.

In one embodiment, an access control entry may specify an identifier of a particular resource 140, an access identifier of a particular principal 100, and one or more access types that denote the type of access operations the particular principal 100 may perform with respect to the particular resource 140. For example, as noted above, in some embodiments resources 140 may correspond to respective URLs or URIs and principals 100 may correspond to respective access identifiers including a subject pool and a principal ID. Thus, an example ACE may include the following information:

Resource: http://store.host.com/users/smith/file.txt
Principal ID: 198306950293
Subject Pool HostComStorageCustomers-Americas
Access Type FullControl In this example, the ACE includes a URI identifying a particular resource, which in this case denotes a text file stored at a particular host address. The ACE also includes an access identifier explicitly denoted as a twelve-digit numeric principal ID value and a string identifying the subject pool within which the principal ID is defined. The ACE indicates that the principal 100 identified by the indicated subject pool and principal ID has the access type "FullControl" with respect to the identified resource 140. In one embodiment, this access type may be a standard access type defined for any type of resource 140 that indicates that any type of access operation defined for a resource 140 may be performed on behalf of the indicated principal 100. For example, if read, write and delete operations are defined for a given resource 140, a principal 100 having the FullControl access type may request to perform any of these operations on the given resource 140.

Generally speaking, access types for a resource 140 may be defined relative to the operations that the resource 140 supports. In some embodiments, for each operation supported by a resource 140, there may exist a corresponding access type. For example, for the given resource 140 mentioned in the previous paragraph, Reader, Writer and Deleter access types may be defined to correspond to the read, write and delete operations. In other embodiments, a given access type may apply to multiple different access operations. For example, a resource 140 may correspond to a queuing service configured to provide data or event storage having the operational semantics of a queue data structure. Such a resource 140 may be configured to support operations to configure or delete queues as well as operations to enqueue, dequeue, or read entries stored to a particular queue. In one embodiment, an Enqueuer access type may be defined to correspond to the enqueue operation, a Dequeuer access type may be defined to correspond to the read and dequeue operations, and a Manager access type may be defined to correspond to the configure and delete queue operations.

For a given access operation relative to a particular resource 140, a given access type may be necessary, sufficient, or both necessary and sufficient, depending on the access policy to be enforced for the particular resource 140. For example, the FullControl operation may be sufficient to perform any resource operation, as mentioned above. For the previous queuing service example, the Manager access type may be both necessary and sufficient to perform either of the configure or delete queue operations. In some embodiments, a particular access operation may require that a principal 100 have multiple specific access types. That is, no single access type may be sufficient to perform the particular operation. It is contemplated that a principal 100 may be associated with more than one access type with respect to a given resource 140. In some embodiments, an ACE may be configured to indicate all access types granted to the indicated principal 100 for the indicated resource 140, while in other embodiments multiple distinct ACEs may be used to indicate each distinct access type granted to a principal 100.

An ACE may be implemented as a structured data record in any of a number of suitable ways. In one embodiment, access control information for a resource 140 may be implemented as one or more tables each including records and fields. One example of such a table is illustrated in FIG. 3. In the illustrated embodiment, resource table 300 may include a number of ACEs 310, each of which corresponds to a record including a number of fields. Specifically, ACE 310 includes a resource URI field 320, a principal ID field 330, a subject pool field 340, and an access type field 350.

In one embodiment, table 300 may be implemented as a relational table in which the meaning or data type of a particular field is defined as a function of the position of the field within the table. For example, a relational schema may be specified for table 300 that explicitly defines the first column of the table to correspond to resource URI data, the second column to principal ID data, and so forth. In an alternative embodiment, table 300 may be implemented as a collection of records in which the meaning of a field does not depend on the position of the field within the record, but instead is indicated by an explicit tag associated with the contents of the field. For example, the records comprising table 300 may be formatted in a suitable markup language, such as a version of eXtensible Markup Language (XML). One example of an XML record corresponding to the previously presented example ACE is:

<record id="1">
<resourceID>http://store.host.com/users/smith/file.txt</resourceID>
  <principalID>198306950293</principalID>
  <subjectPool>HostComStorageCustomers-Americas</subjectPool>
  <accessType>FullControl</accessType>
</record>

In this example, each field of the record is expressly delimited by a tag that may govern how the field is interpreted. That is, the record may be considered self-describing, in that it may include both data and metadata (e.g., the tags) that instruct as to the significance of the data. It is noted that in other embodiments, any suitable techniques for implementing relational data, self-describing data or a combination of the two may be used to implement data structures for storing access control information, such as table 300.

In one embodiment, ACS 150 may be configured to store and retrieve ACEs 310 within data store 160, as well as to process ACEs to determine whether requests to perform access operations to various resources 140 on behalf of principals 100 are allowable. ACS 150 may be configured to present a variety of functions for creating, storing, searching and performing other relevant actions on ACEs via one or more APIs. For example, ACS 150 may be configured to present such functions as web services calls that may be directly or indirectly invoked by clients 110. Alternatively, ACS 150 may be configured to present such functions through an API that may not be visible as a web service. For example, ACS 150 may be configured to treat those components or entities (e.g., web services interface 130) on its side of network 120 as "local," and to present a private Java or HTTP interface for accessing ACEs to local components without making the interface visible to clients 110 or other entities separate from ACS 150 by network 120. In some embodiments, ACS 150 may present both a web services interface and a local interface for managing access control information, although the functionality supported by each interface may differ in some cases.

ACS 150 may be configured to support a variety of operations for creating and managing ACEs for various resources 140. In one embodiment, ACS 150 may support the basic set of operations CreateResource, GrantAccess, and RevokeAccess. The CreateResource operation, in one embodiment, may accept as parameters a resource identifier (e.g., a URL or URI) corresponding to a given resource 140 as well as an access identifier (e.g., a subject pool ID and a principal ID) indicating the principal 100 on behalf of which the given resource 140 is being created. In response to invocation of the CreateResource operation, ACS 150 may be configured to generate an ACE 310 that reflects the provided resource and principal identifying information, and to store the generated ACE within data store 160 (described in detail below). In some embodiments, ACS 150 may first determine whether an ACE 310 already exists for the given resource 140, and if so, may return an error condition as a result of the CreateResource operation instead of generating a new ACE 310. It is contemplated that ACS 150 may also be configured to detect other types of error conditions during the processing of the CreateResource or other access control operations, and to return appropriate error status information. For example, if an operation failed to complete due to a communication error, hardware fault, security violation or other reason, ACS 150 may be configured to report a corresponding error to the calling entity on behalf of which the operation was initiated (e.g., web services interface 130 or a client 110).

In one embodiment, during processing of the CreateResource operation, ACS 150 may set the access type field of the generated ACE 310 to the FullControl access type, indicating that the identified principal 100 may perform any operation with respect to the given resource 140. In some embodiments, any principal 100 having the FullControl access type with respect to a resource 140 may be considered an owner of that resource 140. In some such embodiments, ACS 150 may enforce the requirement that a resource 140 may have only one principal 100 as an owner, while in other embodiments, an arbitrary number of principals 100 may be designated as owners.

The GrantAccess operation may be processed by ACS 150 to add an ACE 310 for a given existing resource (e.g., a resource 140 for which a CreateResource had previously been performed). In one embodiment, the GrantAccess operation may accept parameters including: a resource identifier corresponding to a given resource 140, an indication of an access type to be granted with respect to the given resource 140, and an access identifier indicating the principal 100 to which the indicated access type is to be granted with respect to the given resource 140. In some embodiments, only an owner of a resource 140 (e.g., a principal 100 having the FullControl or another suitable access type for that resource 140) may be allowed to perform the GrantAccess operation. In some such embodiments, the GrantAccess operation may require a parameter indicating the access identifier corresponding to the principal 100 that invoked the GrantAccess operation. To process the GrantAccess operation in such embodiments, ACS 150 may be configured to determine whether an ACE 310 exists that indicates that the invoking principal 310 has the FullControl access type with respect to the given resource 140. If so, ACS 150 may be configured to generate a new ACE 310 corresponding to the principal 100 to which access has been granted, and may store the new ACE 310 within data store 160. In some embodiments, if the new ACE 310 would essentially duplicate an existing ACE 310, or if the invoking principal 100 does not have sufficient privileges to request the GrantAccess operation, ACS 150 may abort the operation and return an error.

The RevokeAccess operation may be processed by ACS 150 to remove an existing ACE 310 from data store 160 for a given existing resource 140, thereby breaking the association between the principal 100, the resource 140 and the access type indicated in the removed ACE 310. In one embodiment, the RevokeAccess operation may accept parameters including: a resource identifier corresponding to a given resource 140, and an access identifier indicating the principal 100 whose access to the given resource 140 is to be revoked. In one embodiment, to process the RevokeAccess operation ACS 150 may be configured to remove all existing ACEs 310 that indicate the given resource 140 and the indicated principal 100. In other embodiments, the RevokeAccess operation may further allow one or more specific access types to be revoked. Correspondingly, ACS 150 may be configured to remove only those ACEs 310 that indicate the given resource 140, the indicated principal 100, and at least one of the specified access types, leaving other ACEs 310 intact.

As with the GrantAccess operation, in some embodiments only a principal 100 having FullControl or another sufficient access type for a resource 140 may be allowed to invoke the RevokeAccess operation. Correspondingly, in some such embodiments ACS 150 may be configured to determine whether the invoking principal 100 has sufficient privileges to request the RevokeAccess operation. If not, ACS 150 may generate an error condition. An error may also be generated for other circumstances, such as if no ACE 310 matching the specified parameters exists to be revoked. As described in greater detail below in conjunction with the description of data store 160, in some embodiments, ACS 150 requesting that a given ACE 310 be removed from data store 160 may result in the given ACE 310 being marked as deleted, although the data contents of the ACE record may be preserved within data store 160 for an arbitrary period of time after the record is marked as deleted.

As mentioned above, in some embodiments, only a principal 100 with owner privileges for a resource 140 (e.g., the FullControl or another suitable access type) may be allowed to change the state of ACEs 310 corresponding to that resource. In other embodiments, different access types instead of or in addition to the FullControl access type may be defined with respect to operations for managing access control information of a resource 140. For example, an access type may be associated with each of the GrantAccess, RevokeAccess or other operations supported by ACS 150, such that a principal having the appropriate access type may be allowed to perform corresponding operations on the access control information of a resource 140.

It is further contemplated that in some embodiments, a principal 100 that has privileges to alter the access control information of a resource 140 (e.g., as reflected in ACEs 310) may be allowed to delegate those privileges to other principals 100 (e.g., through the creation of ACEs 310 specifying appropriate access types). In other embodiments, ACS 150 may be configured to prevent the delegation of such privileges, either globally or on a per-resource basis according to the resource's access control policy. For example, ACS 150 may be configured to prevent one principal 100 having the FullControl access type for a resource 140 from performing a GrantAccess operation to add another principal 100 to that resource 140 with the FullControl access type.

In some embodiments, ACS 150 may also be configured to store additional tables that may be partially or totally derived from the access control information stored in table 300. For example, table 300 may completely reflect the known associations between principals 100 and resources 140. However, this information may be processed in several different ways by different types of operations, such as described below. For example, in different circumstances it may be relevant to query access control information according to either resources 140 (e.g., to determine associated principals 100) or principals 100 (e.g., to determine associated resources 140). Thus, in some embodiments, ACS 150 may be configured to generate and maintain one or more tables that correspond to different views of the data reflected in table 300. For example, data in two different table views may be respectively optimized for searching according to either principals 100 or resources 140. Such table views may be stored within data store 160 in a manner similar to storage of table 300. In some such embodiments, either ACS 150 or data store 160 may be configured to update or refresh such derivative tables in response to changes in the primary data from which those tables are derived.

The operations just described (or suitable variants thereof), as implemented by ACS 150 and invoked through the actions of principals 100 and clients 110, may function to generate a body of access control information for a variety of resources 140 and principals 100, organized as ACEs 310 arranged within one or more tables 300 that may be stored by data store 160. In one embodiment, ACS 150 may be configured to process this body of access control information to determine whether principals' requests to perform access operations directed to various resources 140 should be allowed or denied. Specifically, in one embodiment ACS 150 may implement a HasAccess operation that may take parameters including an access identifier of a given principal 100, a resource identifier of a resource 140 for which an access operation on behalf the given principal 100 has been requested, and a required access type for the requested access operation, as specified by an access policy associated with the resource 140. (In some embodiments, as detailed below, the HasAccess operation may also receive a list of container resources corresponding to the specified resource 140, where the ACEs of the container resources may be examined in addition to the ACE of the specified resource 140.) ACS 150 may process the HasAccess operation to determine whether the request is allowable.

Figures 4, 5:
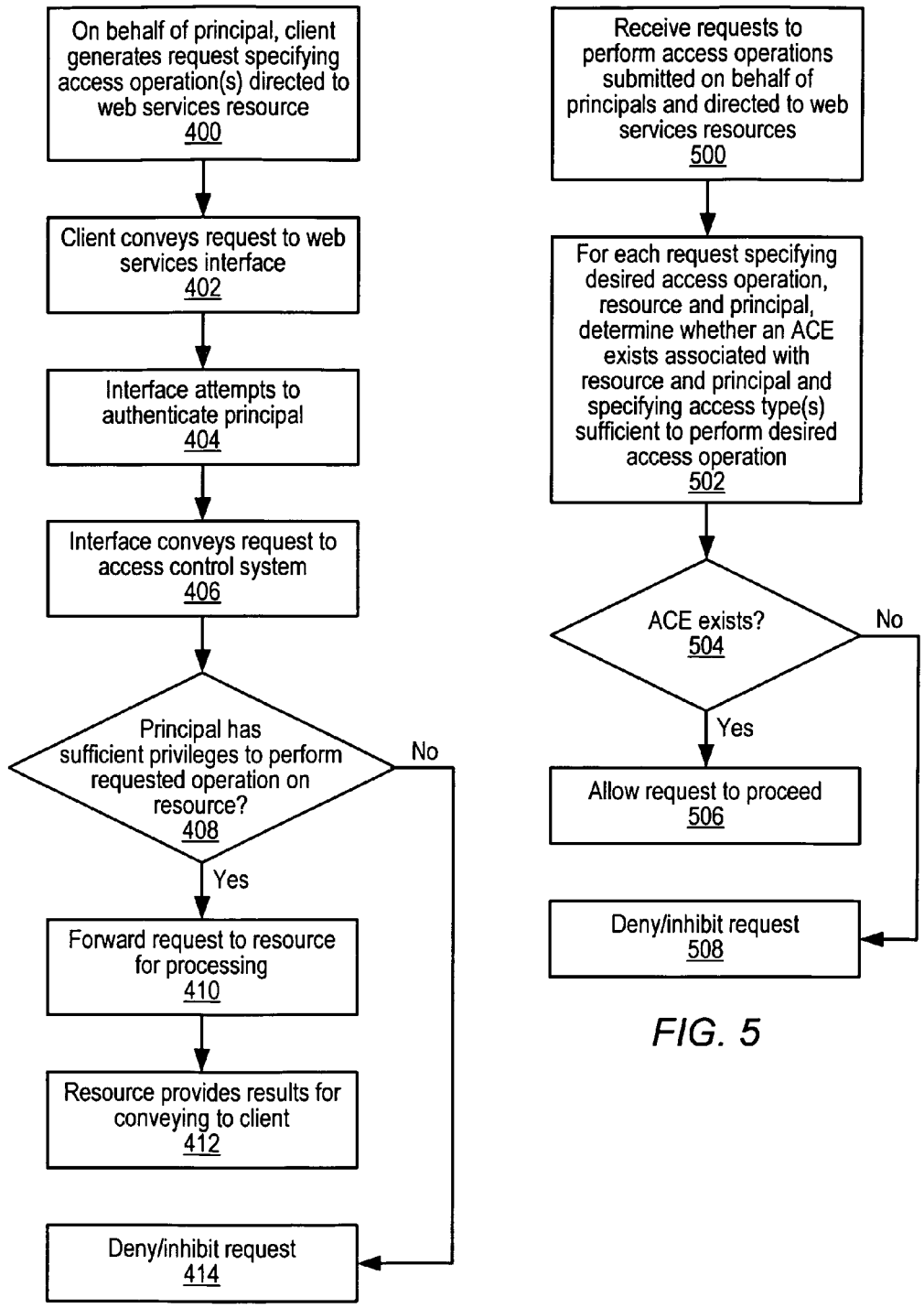
FIG. 4 is a flow diagram illustrating one embodiment of a method of operation of a web services architecture including an access control system.
FIG. 5 is a flow diagram illustrating one embodiment of a method of operation of an access control system to verify access privileges of principals with respect to web services resources.

The operation of the general web services architecture of FIG. 2A in processing access requests directed to web services resources will first be considered, followed by a specific embodiment of the operation of ACS 150 in the context of such request processing. One embodiment of a method of operation of the system architecture of FIG. 2A is shown in FIG. 4. Referring collectively to FIGS. 2A, 3 and 4, operation begins in block 400 where web services client 110, on behalf of a principal 100, generates a request specifying one or more access operations directed to a web services resource 140. For example, client 110 may generate an HTTP request or an XML document specifying the URI of the resource 140 as well as information about the requested operation (e.g., read, write, delete or any other defined operation).

The client 110 may then convey the generated request to web services interface 130 (block 402). For example, client 110 may convey the request via network 120 using appropriate transport and network protocols. Upon receipt, interface 130 may attempt to authenticate the principal 100 corresponding to the request (block 404). For example, interface 130 may attempt to verify the credentials of the principal 100, which may be included within the request or received through a separate interrogation conducted by interface 130. Such credentials may include the principal's access identifier or another identifier, such as a username, as well as a password, cookie or other type of security token. Interface 130 may then attempt to verify the credentials against an authority, such as an internal database of credentials or a third party authentication service.

If interface 130 cannot authenticate the principal 100, in one embodiment interface 130 may instruct that the principal 100 be treated as an anonymous user. For example, when forwarding the request to ACS 150 for further action, interface 130 may substitute the fields of the principal's access identifier (e.g., the subject pool and principal ID fields, in one embodiment) with predefined data indicative of an anonymous user. In other embodiments, interface 130 may simply reject the request if the principal 100 cannot be authenticated. In some embodiments, interface 130 may treat a previously-authenticated principal 100 as authenticated for certain subsequent requests without deliberately verifying the principal's credentials. For example, interface 130 may implement state information allowing a previously authenticated principal 100 to remain authenticated for a certain period of time, or indefinitely provided a timeout period (e.g., 30 minutes) has not elapsed between the principal's requests.

Interface 130 may then convey the request to ACS 150 for processing (block 406). In some embodiments, interface 130 may invoke, on behalf of the principal 100 corresponding to the request, a particular function or operation presented by the API exposed by ACS 150, such as the HasAccess operation, for example. In some such embodiments, interface 130 may not present the actual request received from client 110, but may instead select appropriate data from that request (e.g., the URI of the requested resource 140, the access identifier of the principal 100, etc.) to be used in generating an appropriate call to ACS 150. In other embodiments, interface 130 may simply pass along the received message document corresponding to the web services request to ACS 150, specifying additional data (e.g., authentication results) within the message as appropriate (e.g., as additional data within the body of the message, as SOAP parameters, or in another suitable fashion).

In response, ACS 150 may determine whether the principal 100 has sufficient privileges to perform the requested access operation with respect to the specified resource 140 (block 408). For example, ACS 150 may retrieve and analyze one or more ACEs 310 with respect to the principal's granted access types (if any) relative to the required access type for the operation, as described below. If ACS 150 determines that the principal 100 does have sufficient privileges, the request may be forwarded to the resource 140 for processing (block 410) and the resource 140 may provide results and/or status information to be conveyed back to the client 110 via interface 130 (block 412). If ACS 150 determines that the principal 100 lacks sufficient privileges, the request may be denied or inhibited (block 414). For example, an error indication may be returned to client 110 via interface 130. In some embodiments, failed requests may be dropped without notifying the client 110 or principal 100.

One embodiment of a method of operation of ACS 150 to verify the access privileges of principals 100 with respect to requested access operations on resources 140 is illustrated in FIG. 5. In the illustrated embodiment, operation begins in block 500 where ACS 150 receives requests to perform access operations that are submitted on behalf of principals 100 and directed to corresponding web services. For example, ACS 150 may receive requests that are submitted by clients 110 on behalf of principals 100 and that are forwarded via interface 130, as described above with respect to FIG. 4.

For each received request specifying a desired access operation, a particular resource 140 and a particular principal 100, ACS 150 may be configured to determine whether an ACE 130 exists that is associated with both the particular resource 140 and the particular principal 100, and that specifies one or more access types that are sufficient (either individually or collectively) to perform the specified access operation (blocks 502-504).

For example, ACS 150 may be configured to search through one or more instances of table 300 (which may be stored as a collection of records by data store 160, in some embodiments) to determine whether any ACE 310 matches the resource identifier (e.g., the URL or URI) of the particular resource 140 and the access identifier (e.g., subject pool and principal ID) of the particular principal 100, and further includes one or more access types sufficient to perform the specified access operation according to the access policy in place for the particular resource 140.

In various embodiments, ACS 150 may employ any suitable search strategy. For example, ACS 150 may first request data store 160 to return all ACEs 310 corresponding to the particular resource 140, and may then filter these according to the particular principal 100. In another embodiment, ACS 150 may request all ACEs 310 corresponding to the particular principal 100 and may then filter these according to the particular resource 140. In still another embodiment, ACS 150 may convey a set of search parameters to data store 160 and allow the latter to conduct its own search strategy.

To determine whether the access type(s) specified by an ACE 310 are sufficient to perform the specified access operation, in one embodiment, ACS 150 may consult the access policy for the particular resource 140. In some embodiments, a resource's access policy may be stored as a table or other collection of records that may explicitly indicate the access operations and access types that are defined for a resource 140 and the relationship between the two (e.g., denoting the access types that are necessary, sufficient, or both for a given operation). In various embodiments, the access policy records may be stored within ACS 150 or data store 160 as distinct tables associated with their respective resource 140. Alternatively, in one embodiment each resource 140 may be configured to store its own access policy records, for example within a metadata field associated with the resource 140. For example, in addition to its content (e.g., the data or code corresponding to the resource), a resource 140 may include metadata that may identify various characteristics of the resource, such as its date of creation, size, access policy, or other aspects.

It is contemplated that in some embodiments, ACS 150 may not directly evaluate the access policy for the particular resource 140. Instead, another entity (e.g., interface 130) may evaluate the access policy and may convey an indication of the required access type for the requested operation to ACS 150, to be compared against the access type(s) indicated by any ACEs 310 corresponding to the particular resource 140 and principal 100.

In response to determining that there exists at least one ACE 310 corresponding to the particular resource 140 and principal 100 and indicating one or more access types sufficient to perform the requested operation, ACS 150 may be configured to allow the request to proceed (block 506). In one embodiment, ACS 150 may be configured to forward the request to the particular resource 140 for processing contingent upon the particular principal 100 having sufficient privileges to perform the requested operation. In other embodiments, resource 140 may begin processing the requested operation before ACS 150 completes its determination, in which case the requested operation may be aborted if ACS 150 subsequently determines the operation should be disallowed. (This approach may not be employed for operations that could cause a change in state of the particular resource 140.)

In response to determining that there does not exist any ACE 310 corresponding to the particular resource 140 and principal 100 and indicating one or more access types sufficient to perform the requested operation, ACS 150 may be configured to deny the request to perform the access operation (block 508). For example, the particular principal 100 may have certain associated access types for the particular resource 140, but not those necessary for the requested operation. In other cases, the particular principal 100 may lack any privileges with respect to the particular resource 140, or either the particular principal 100 or resource 140 may not exist with respect to the access control information managed by ACS 150.

It is noted that in some embodiments, if the particular principal 100 fails to be authenticated by interface 130, the above determination regarding ACEs 310 may be performed by ACS 150 as though the particular principal 100 were anonymous, regardless of the access identifier of the particular principal 100. That is, even if an ACE 310 existed corresponding to the particular principal 100 and resource 140 and indicating a sufficient access type for the requested operation, this ACE 310 may be ignored if the particular principal 100 is not authenticated. Instead, the requested operation may be allowed only if there exists an ACE 310 corresponding to the anonymous principal and the particular resource 140 and indicating a sufficient access type for the requested operation. In such embodiments, a particular access identifier unique to the anonymous principal may be defined (e.g., by ACS 150), and the anonymous principal may have access types granted or revoked for various resources 140 just as any other principal 100 may.

In some embodiments, ACS 150 may be configured to concurrently perform the above-described operations on multiple different requests for access operations to multiple distinct, unrelated resources 140. That is, ACS 150 may be configured to implement a general model for access control to web services resources, regardless of the nature of those resources. It is not necessary that the resources 140 for which ACS 150 manages access control information be hosted or implemented by the enterprise or system(s) that implement ACS 150. As described in greater detail below, in some embodiments ACS 150 may be configured to implement and process access control information for web services resources 140 as a web service itself.

ACS 150 may also be configured to implement other functions or operations to aid resource owners and other clients of ACS 150 in the management of access control information for resources 140. In one embodiment, ACS 150 may be configured to implement one or more of the following operations, which may be presented through its API as available web services calls or other types of function calls: GetResourceOwner, ListResourceAccess, GetUserRightsForResource, and GetAccessibleResources.

Generally speaking, the GetResourceOwner operation may allow the entity invoking the operation to determine which principal(s) 100 have ownership of a resource 140. One embodiment of the GetResourceOwner operation may take a resource identifier (e.g., URI) of a particular resource 140 as a parameter. In one embodiment, to implement the GetResourceOwner operation, ACS 150 may be configured to examine the access control information associated with the identified resource 140 to determine the owner(s) of that resource. For example, ACS 150 may be configured to search ACEs 310 corresponding to the particular resource 140 to identify an entry that indicates an access type of FullControl, or another access type or property indicative of resource ownership as defined for the particular resource 140. ACS 150 may then return the access identifier of the principal 100 indicated within the entry as a result of the operation. In some embodiments, if a resource 140 may have multiple ACEs 310 indicating multiple different principals 100 as having ownership privileges, ACS 150 may be configured to return the access identifiers of each such principal 100.

The ListResourceAccess operation may generally function to allow the entity invoking the operation to determine what principals 100 have any sort of access rights to a resource 140. One embodiment of the ListResourceAccess operation may take a resource identifier of a particular resource 140 as a parameter. In one embodiment, to implement the ListResourceAccess operation, ACS 150 may be configured to examine the access control information associated with the identified resource 140 to identify all of the ACEs 310 associated with that resource. For example, ACS 150 may be configured to perform a similar search of ACEs 310 as for the GetResourceOwner operation, but without restrictions on the access type of records satisfying the search. ACS 150 may then return each ACE 310 corresponding to the identified resource 140 as a result of the operation.

The GetUserRightsForResource operation may generally function to allow the entity invoking the operation to identify those access rights, if any, that a principal 100 has with respect to a resource 140. One embodiment of the GetUserRightsForResource operation may take a resource identifier of a particular resource 140 and an access identifier of a particular principal 100 as parameters. In one embodiment, to implement the ListResourceAccess operation, ACS 150 may be configured to identify those ACEs 310 that correspond to the particular resource 140 and principal 100. If any such ACEs 310 exist, ACS 150 may be configured to return as a result of the operation those access types indicated within the matching ACEs 310, for example as a list of access types.

The GetAccessibleResources operation may generally function to allow the entity invoking the operation to identify those resources 140, if any, for which a principal 100 has any associated access rights. One embodiment of the GetAccessibleResources operation may take an access identifier of a particular principal 100 as a parameters. In one embodiment, to implement the GetAccessibleResources operation, ACS 150 may be configured to identify those ACEs 310 that correspond to the particular principal 100 and to return indications of those resources 140 identified in such ACEs 310.

It is contemplated that in some embodiments, ACS 150 may be configured to implement operations on access control information in addition to or instead of those operations described above. In one embodiment, ACS 150 may be configured to implement operations to support the generation and management of groups of principals 100. Generally speaking, a group may function as a principal 100 with respect to access control information of resource 140, in that it may have a unique access identifier that may be specified in an ACE 310. Thus, a group may be granted an access type with respect to a resource 140, for example using the GrantAccess operation described above. However, a group may designate a number of principals 100 as members of the group. In one embodiment, each principal 100 that is a member of a given group may inherit all of the access privileges explicitly associated with the given group. That is, if a given group identified as G has an associated access type A with respect to a particular resource R, as indicated by a particular ACE 310, then a principal P that is a member of group G may implicitly have access type A with respect to resource R, even though there may exist no ACE 310 directly associating principal P with resource R. Thus, groups may allow the indirect association of access types between principals 100 and resources 140.

In one embodiment, a group may correspond to a resource 140. For example, a group may be implemented as a list of access identifiers denoting the principals 100 that are members of the group. The list may be stored as a data object corresponding to a particular URI. In some embodiments, ACS 150 may be configured to maintain group identity information within one or more tables, such as table 600 shown in FIG. 6. In the illustrated embodiment, table 600 may be configured to associate the access identifier (e.g., subject pool and principal ID) of a group with the resource identifier (e.g., the URI) of the group. Specifically, table 600 may include multiple entries 610, each of which may include several fields or columns. In the illustrated embodiment, each entry 610 includes a subject pool field 620, a principal ID field 630, and a resource ID field 640. For a given group corresponding to a given entry 610, these fields may respectively be configured to store indications of the subject pool, principal ID and URI of the given group.

In some embodiments, ACS 150 may also be configured to store additional tables, e.g., within data store 160, that reflect the association of a given group to its member principals 100, as well as the association of a given principal 100 to the groups of which it is a member. Such tables may expedite queries associated with determining whether a principal 100 is a member of a particular group or vice versa, as may occur during processing of access control information to determine a given principal's access privileges. In some embodiments, ACS 150 and/or data store 160 may be configured to derive such tables from the resources 140 corresponding to the various defined groups, and may further be configured to update such derivative tables when the primary data corresponding to resources 140 changes, for example as a result of the operations described below.

In some embodiments that support groups of principals 100, ACS 150 may be configured to implement operations to manage the creation and maintenance of groups. In one embodiment, ACS 150 may be configured to implement one or more of the following operations: CreateGroup, AddUserToGroup, and RemoveUserFromGroup.

The CreateGroup operation may generally function to allow the entity invoking the operation to establish a new group as a resource 140. One embodiment of the CreateGroup operation may take an access identifier of the principal 100 on behalf of which the group is being created as well as a group name as parameters. In one embodiment, to implement the CreateGroup operation, ACS 150 may be configured to generate a URI as a function of the provided access identifier and group name, and to store the generated URI within a new entry 610 of table 600. In one embodiment, ACS 150 may be configured to generate the URI of a group by applying a hash function (e.g., a version of the Message Digest 5 (MD5) algorithm, the Secure Hash Algorithm SHA-1, or another suitable hash function) to the provided access identifier and group name, and appending the resulting hash value to a base URI path designated for group resources 140. In some embodiments, ACS 150 may also be configured to generate the group access identifier (e.g., subject pool and principal ID) to be stored within the newly generated entry 610. For example, the subject pool of the requesting principal 100 may be used as the subject pool of the generated group, and the generated hash value or some other value unique within the subject pool may be used as the principal ID of the generated group. It is noted that groups, as resources 140, may have corresponding access control information as described above, like any other resource. In some embodiments, the principal 100 on behalf of which the group is created may be denoted as the owner of the group, with full privileges to access and modify the state of the group.

The AddUserToGroup and RemoveUserFromGroup operations may generally function to add and remove principals 100 from a previously-defined group, respectively. In one embodiment, both operations may take an access identifier or resource identifier of a group to be modified, as well as an access identifier of a principal 100 to be added to or removed from the identified group. In one embodiment, to implement these operations, ACS 150 may be configured to access the identified group resource 140. In some embodiments, if an access identifier for the group has been provided as a parameter, ACS 150 may be configured to first consult table 600 to identify the resource identifier (e.g., the URI) corresponding to the provided access identifier. ACS 150 may then be configured to modify the resource 140 corresponding to the group to either add or remove the identified principal 100 to or from the group, for example by adding or removing the principal's access identifier to or from the list object corresponding to the group resource 140.

In embodiments that support groups of principals 100, verifying the access privileges of a given principal 100 with respect to a particular resource 140 (e.g., as described above with respect to FIG. 5) may be augmented to include determining the access privileges with respect to the particular resource 140 of any group of which the given principal 100 is a member. For example, as described above, when a given principal 100 requests to perform an access operation on a particular resource 140, ACS 150 may be configured to retrieve and evaluate those ACEs 310 corresponding to the given principal 100 and the particular resource 140 to determine whether the given principal 100 is associated with a sufficient access type to perform the requested operation. In embodiments supporting groups, ACS 150 may also be configured to consult group resources 140, or tables derived from such resources, to determine whether the given principal 100 is a member of any groups. If so, ACS 150 may additionally retrieve those ACEs 310 corresponding to the identified group(s) to determine whether any group having the given principal 100 as a member is associated with a sufficient access type to perform the requested operation on the particular resource 140. If such an ACE 310 exists for a group including the given principal 100, ACS 150 may be configured to allow the requested operation to proceed, even though no sufficient ACE 310 corresponding directly to the given principal 100 may exist.

In some embodiments, ACS 150 may be configured to generate and maintain a predefined group that includes as members all principals 100 that have been authenticated by interface 130. For example, ACS 150 may coordinate with interface 130 to add and remove principals 100 from the authenticated principals group as their authentication status changes (e.g., principals 100 may be removed from the group if their authentication status expires). As with any other group, any access privileges associated with the authenticated principals group may extend to all principals 100 that are members of the group. That is, if an ACE 310 exists that grants a particular access type to the authenticated principals group for a particular resource 140, all principals 100 that are members of the group may be associated with the particular access type for the particular resource 140, by extension.

In the foregoing discussion, determining whether a principal 100 has necessary access rights to perform a particular operation on a resource 140 has been described as a function of the relationship between the principal 100 and the resource 140, either directly or, in some embodiments, as mediated by the principal's group membership. In either case, only the resource itself may be considered in making the determination. However, in some embodiments, a resource 140 may support the hierarchical inheritance of access control information from parent or container resources. For example, the URL or URI identifying a particular resource 140 may be interpreted as a set of nested containers or levels distinguished by occurrences of the single '/' delimiter. In one embodiment, the highest level resource within a URI (e.g., the leftmost portion of the URL up to the first occurrence of the '/' delimiter) may be denoted as level 0, the next resource as level 1, and so forth. For example, for the resource URI http://store.host.com/users/smith/folders/work/file.txt the following levels of containment may be defined, where L denotes the level of the corresponding container resource:

L Container
0: http://store.host.com/
1: http://store.host.com/users/
2: http://store.host.com/users/smith/
3: http://store.host.com/users/smith/folders/
4: http://store.host.com/users/smith/folders/work/
5: http://store.host.com/users/smith/folders/work/file.txt For such an embodiment, a container at level N may be considered an immediate parent of a container at level N+1. Conversely, a container at level N+1 may be considered an immediate child of a container at level N. More generally, for any two containers at levels M and N, where M>N, the container at level N may be referred to as a parent of the container at level M, and the container at level M may be referred to as a child of the container at level N. In some embodiments, an access control policy for a resource 140 may specify that all access control types associated with a principal 100 for a level N container of a resource 140 also apply to a certain number of levels greater than N (e.g., all levels greater than N, only level N+1, etc.). That is, access types that apply at one level of hierarchy may be inherited by lower levels of hierarchy. For example, a principal 100 that has a Delete access type with respect to the level 2 resource shown above (as reflected by a corresponding ACE 310) may also have the Delete access type with respect to the resources at levels 3-5, even if no ACE 310 exists that explicitly associates the principal 100 with any of the latter resources.

The degree to which access types for a particular resource 140 may be inherited from higher levels of containment may be specified in the access policy associated with the particular resource 140 in a number of different ways. For example, the access policy may explicitly specify a set of URIs that should be considered by ACS 150 in addition to the URI of the particular resource 140 when determining a principal's access types for the particular resource 140. Alternatively, the access policy may specify the numeric level corresponding to the highest level of containment that should be evaluated by ACS 150 for the particular resource 140. For example, if the particular resource 140 has a URI corresponding to a level N and the access policy for the particular resource 140 specifies the highest level of containment to be considered as the level 3, then each of the URIs corresponding to levels 3 through N may be examined by ACS 150 for ACEs 310 corresponding to a principal 100. In one embodiment, if the highest level of containment specified in the access policy is a negative number, only the URI of the particular resource 140 itself may be examined. That is, access type inheritance may be effectively disabled in this case. Also, in one embodiment, if the highest level of containment specified in the access policy exceeds the level N of the URI of the particular resource 140, no resource URIs may be examined at all. That is, in this case, the principal 100 may be assumed to have no access types with respect to the particular resource 140.

In embodiments supporting access type inheritance as described above, various operations supported by ACS 150 may be augmented to receive inheritance information as a parameter. For example, in one embodiment the HasAccess operation may be configured to receive a list of URIs to be considered in addition to the URI of a particular resource 140 when determining whether a principal 100 has a particular access type with respect to the particular resource 140. In another embodiment, the HasAccess operation may be configured to receive the numerical indication of the highest level of containment to be considered for the particular resource 140, as described in the previous paragraph. In such an embodiment, ACS 150 may be configured to determine which URIs, if any, should be considered, dependent on the numerical indication and the URI of the particular resource 140.

As described above and shown in the system architecture illustrated in FIG. 2A, in one embodiment ACS 150 may be configured to evaluate the access control information for a particular resource 140 and a particular principal 100 in response to a request received from web services interface 130. For example, ACS 150 may receive such a request via the invocation of an operation that ACS 150 exposes through a web services API or another type of API (e.g., the HasAccess operation described above). In the illustrated embodiment, if ACS 150 determines that the particular principal 100 has a sufficient access type to perform the requested access operation on the particular resource 140, it may forward the access operation request to the particular principal 140 for processing.

However, alternative architectures are possible and contemplated. For example, in the architecture illustrated in FIG. 2B, ACS 150 may not directly convey an access operation request to resource 140. Instead, interface 130 may coordinate the evaluation of the request by ACS 150. In some embodiments, interface 130 may submit the request to resource 140 contingent upon a response from ACS 150 that the particular principal 150 has sufficient privileges to perform the request. In other embodiments, interface 130 may submit certain types of requests (e.g., those requests that do not result in modification of resource state) to resource 140 before a response has been received from ACS 150, and inhibiting or aborting the request if a negative response is subsequently received from ACS 150. This approach may improve the overall response time of resource 140, since the work required by ACS 150 to check a principal's privileges may be performed partially or completely in parallel with the work required by resource 140 to respond to the request. However, in some circumstances the architecture of FIG. 2B may increase the workload of interface 130, which may limit the degree to which this architecture may scale.

Figure 2B:
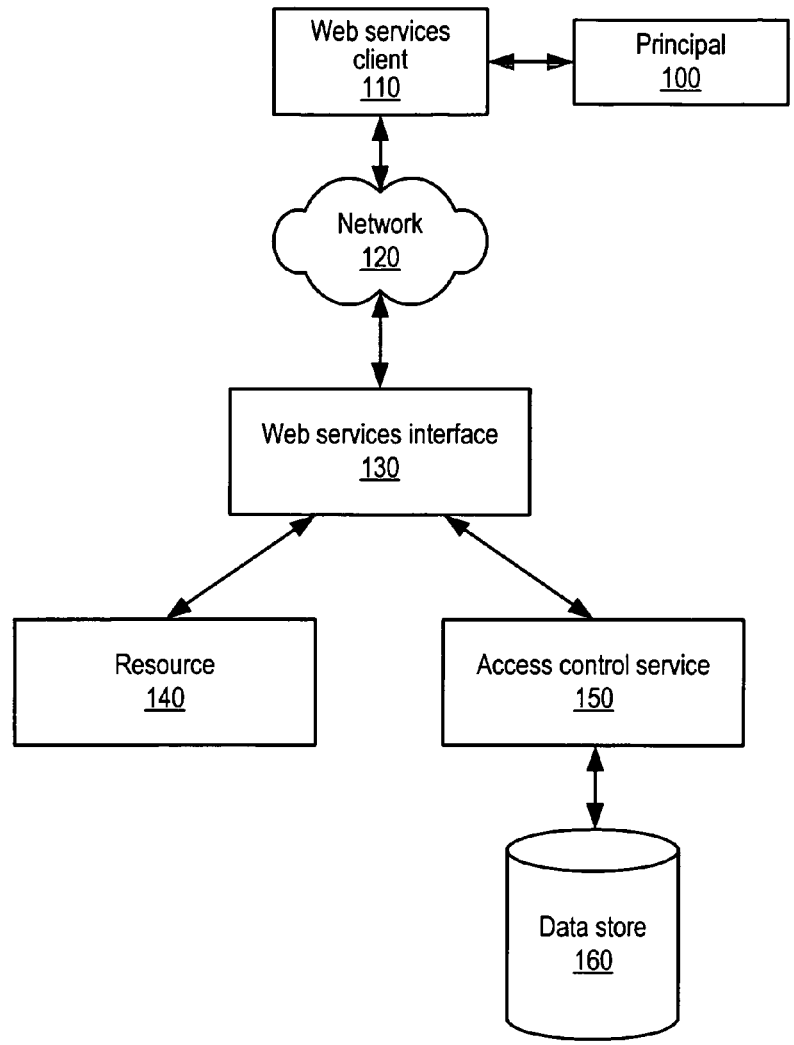
Figure 2C:
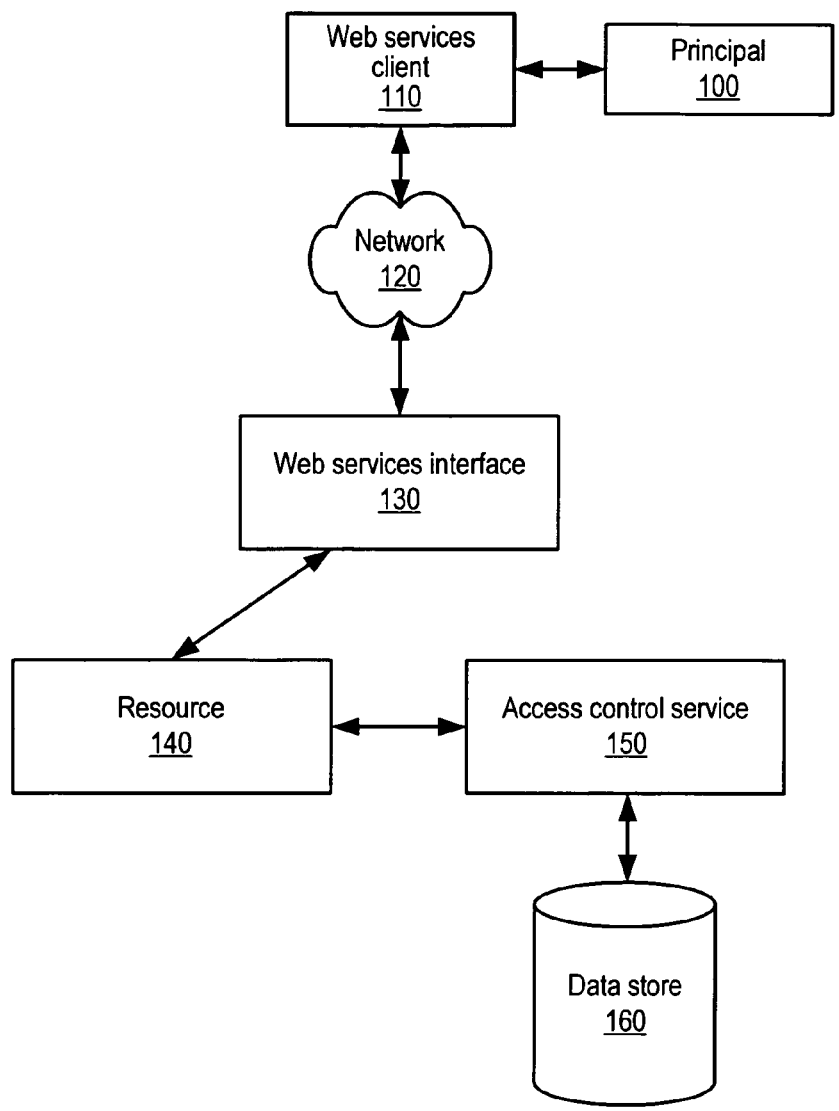

In the architecture illustrated in FIG. 2C, requests to perform access operations are delegated to resources 140, which are each responsible for coordinating with ACS 150 to evaluate the access privileges of principals 100. For example, upon receiving a request to perform an access operation, a resource 140 may submit a corresponding request to ACS 150 for evaluation. Thus, the coordination workload of interface 130 may be reduced at the possible expense of implementing each resource 140 to be aware of the access control API exposed by ACS 150 and to appropriately invoke that API when necessary. It is noted that in the various embodiments shown in FIGS. 2A-C or variants thereof, the request that is received by ACS 150 for evaluation with respect to a given principal 100 and a given resource 140 may be distinct from the request originally submitted on behalf of the given principal 100. For example, interface 130 or resource 140 may transform or modify the original request to generate a distinct request directed to ACS 150 for access control evaluation. In other embodiments, ACS 150 may be configured to process a copy or version of the request originally submitted on behalf of the given principal 100.

Figures 6, 7:
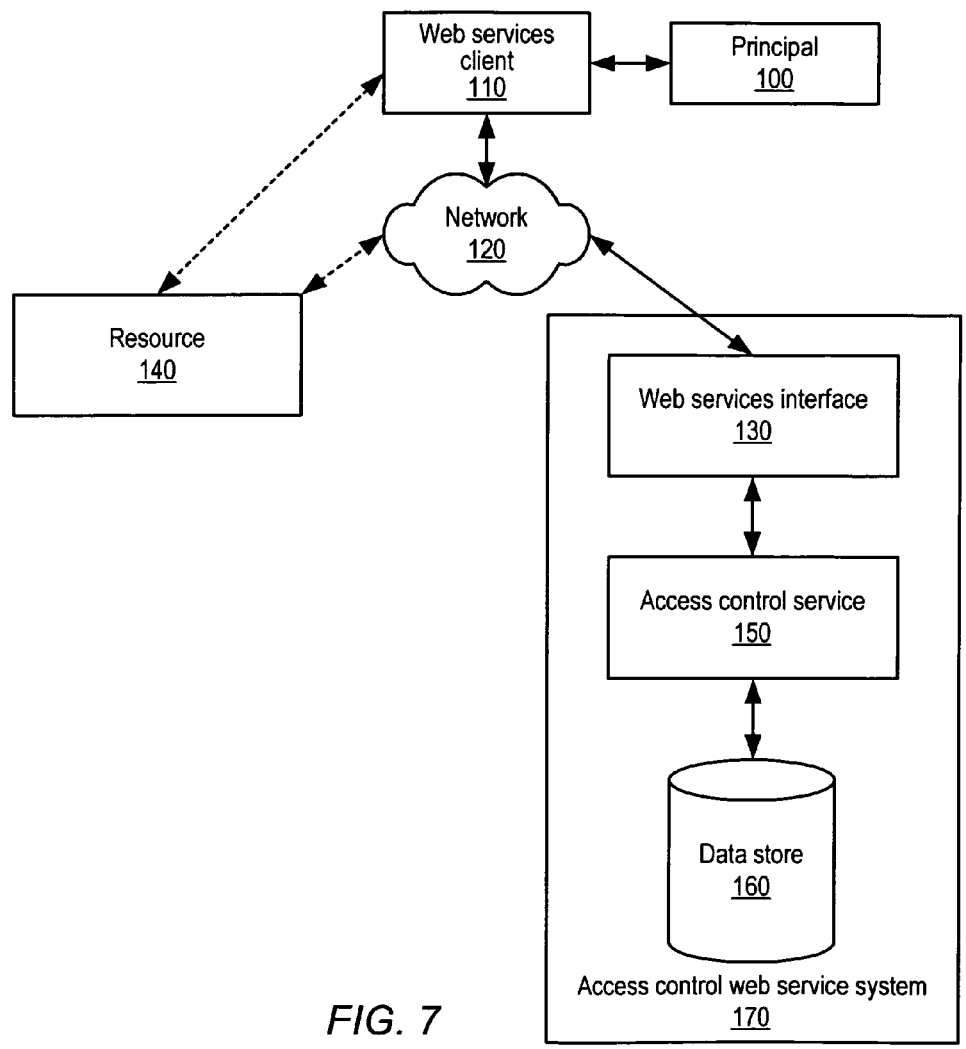
FIG. 6 illustrates one embodiment of a table including entries configured to store access group information for an access control system.
FIG. 7 is a block diagram illustrating a system architecture in which a web services access control system is deployed as a web service.

It is contemplated that in some embodiments, ACS 150 may be implemented as a standalone web service, independent of the resources 140 for which it maintains access control information. One such embodiment is illustrated in FIG. 7. In the illustrated embodiment, web services interface 130, ACS 150 and data store 160 are shown to be configured as a standalone access control web service system 170. In the illustrated embodiment, a resource owner may be configured to register a given resource 140 with system 170, for example by generating web services calls to system 170 corresponding to the above-described CreateResource and GrantAccess operations. However, system 170 need not have any direct communication or interaction with the resources 140 for which it manages access control information. For example, as shown in FIG. 7, client 110 may be configured to communicate with resource 140 either directly or via network 120, without intervention on the part of system 170.

Figure 8:
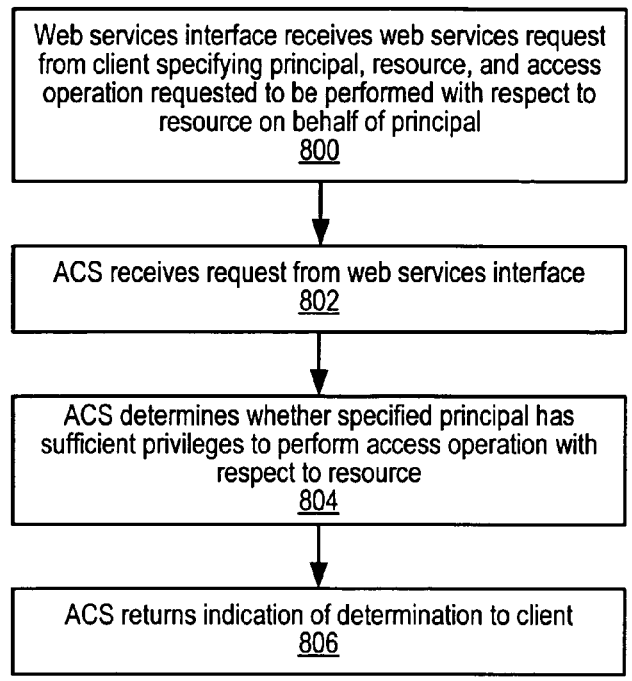
FIG. 8 is a flow diagram illustrating one embodiment of a method of operation of a web services access control system as a web service.

In such an architecture, system 170 may generally be configured as an access policy storage and evaluation service that may provide an assessment of whether a principal 100 is sufficiently privileged to access a given resource 140, while leaving actual enforcement based on that assessment to another entity such as client 110. One embodiment of a method of operation of system 170 is illustrated in FIG. 8. Referring collectively to FIGS. 7 and 8, operation begins in block 800 where web services interface 130 receives a web services request from a client 110. The request may specify a principal 100 (e.g., by access identifier), a web services resource 140 (e.g., by URI), and an access operation requested to be performed with respect to the specified resource 140 on behalf of the specified principal 100.

It is noted that in this architecture, the request received by interface 130 may or may not be the same request as the one directed to resource 140. For example, the request received by interface 130 may be directed specifically to system 170, specifying a particular operation to be performed by ACS 150 with particular parameters. By contrast, the actual access operation to resource 140 that is the subject of the evaluation request to system 170 may be transmitted from client 110 to resource 140 using a differently-formatted request specifying different parameters. In some embodiments, the web services request to system 170 may be considered a meta-request or meta-operation with respect to a corresponding request to resource 140 that is to be evaluated for access privileges. In some such embodiments, the principal 100 (and possibly the client 110) that submits a meta-request to system 170 may be different from the principal 100 on behalf of which the access operation directed to resource 140 is requested.

ACS 150 may then receive the web services request from interface 130 (block 802). In some embodiments, as described previously, interface 130 may be configured to forward a request to ACS 150 contingent upon successfully authenticating the credentials of the requestor. In response to receiving the request, ACS 150 may determine whether the specified principal 100 has sufficient access privileges to perform the access operation with respect to the specified resource 140 (block 804). For example, ACS 150 may attempt to determine whether there exists an ACE 310 that corresponds to the specified principal 100 and resource 140 and indicates one or more access types sufficient to perform the specified access operation, as described above with respect to FIG. 5.

ACS 150 may then return an indication to the requesting client 110 indicative of the results of its determination (block 806). For example, if ACS 150 determines that the specified principal 100 does not have sufficient privileges to perform the requested operation (e.g., based on failing to find a satisfactory ACE 310), it may return an indication to the client 110 that the principal 100 lacks sufficient privileges to perform the requested operation. If ACS 150 confirms that the principal does have sufficient privileges (e.g., based on identifying a corresponding, sufficient ACE 310), it may return a positive indication that the principal 100 is sufficiently privileged to perform the requested operation.

As mentioned previously with respect to client 110, interface 130 and resource 140, it is noted that in some embodiments, ACS 150 may denote any suitable configuration of computer system(s) or portions of computer systems configured to implement the respective functionality of these components. An exemplary embodiment of such a computer system is discussed below in conjunction with the description of FIG. 18. However, in such embodiments, it is noted that the illustrated partitioning of functionality need not map directly to a corresponding partitioning of computer systems. For example, various combinations of interface 130, ACS 150 and/or resource 140 may be implemented by the same system. Alternatively, any of these components may be distributed for implementation across several distinct systems.

Distributed Data Store System

In some embodiments, any of the web services architectures of FIGS. 2A-C, or suitable variants thereof, may be extended to encompass large numbers of principals 100 and resources 140. Additionally, components such as interface 130 and ACS 150 may be duplicated at a number of different sites in order to provide accessibility and reliability of service to a widely distributed set of clients 110 and principals 100. As implementations of the architecture scale to meet the demand for web services resources, a large amount of structured access control information may be generated (e.g., in the form of ACEs 310 and other types of structured data, as described above). Moreover, a considerable volume of processing requests to such data may be generated, as ACS 150 works to verify the privileges of the many principals 100 on behalf of which access requests to resources 140 may be submitted.

Moreover, the access control information managed by ACS 150 may be critical to the integrity and performance of the web services architecture as a whole. Should access control information be lost or corrupted, for example due to device or communications failures, the services provided by resources 140 could be disrupted on a massive scale, as it may become difficult or impossible to verify the access privileges of a given principal 100. Even transient, recoverable failures in the availability of access control information may have negative impacts on the performance of the architecture, for example if a backlog of access requests accumulates pending verification by ACS 150. Thus, the availability of a reliable and scalable data store 160 for storing the large amounts of structured data managed by ACS 150 may be critical to the successful deployment of the access control model described hereinabove, for at least some large-scale implementations.

Figure 9:
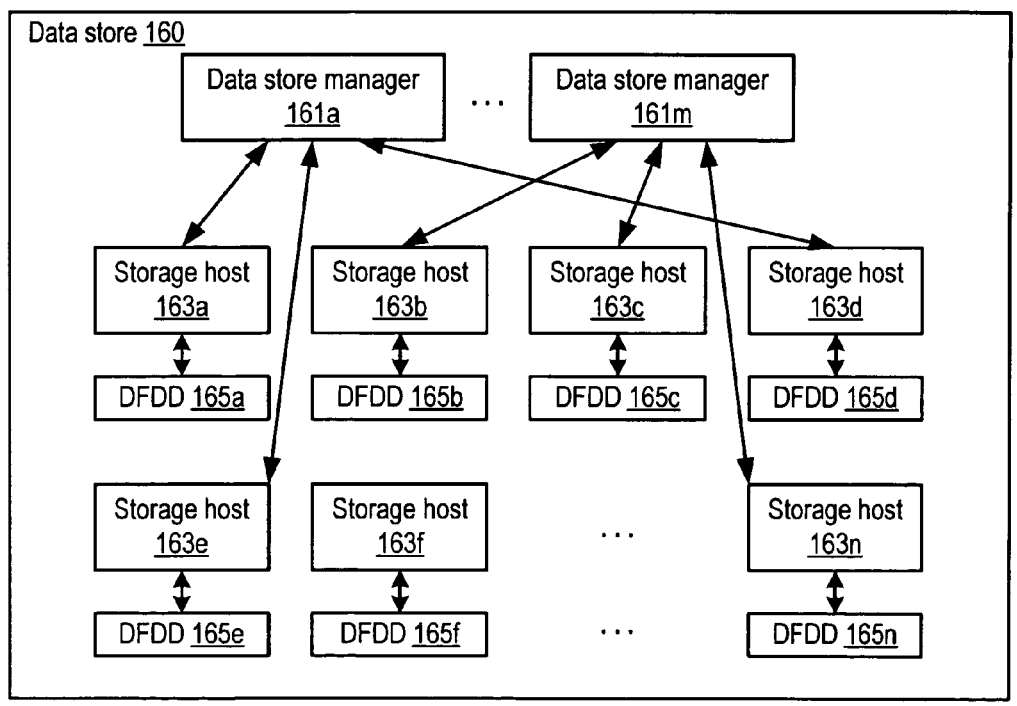
FIG. 9 is a block diagram illustrating one embodiment of a data store configured to store structured data records among a distributed set of hosts.

In one embodiment, data store 160 may be configured to store structured data records, such as ACEs 310 and the various other types of records and tables described above, in a distributed, replicated fashion among a plurality of independent storage hosts. One such embodiment of data store 160 is illustrated in FIG. 9. In the illustrated embodiment, data store 160 includes a number of instances of a data store manager 161a-m and a number of storage hosts 163a-n. Each of the data store managers 161 is configured to communicate with any of the storage hosts 163. Additionally, each of the storage hosts 163 is configured to communicate with a respective instance of a discovery and failure detection daemon (DFDD) 165. In various embodiments, different numbers of data store managers 161 and storage hosts 163 (or simply, managers 161 and hosts 163) may be included within data store 160, and the number of managers 161 may differ from the number of hosts 163.

Generally speaking, each of managers 161 may be configured to present a storage interface API. In some embodiments, this API may be configured as a web services API accessible via a respective web services endpoint corresponding to each manager instance, while in other embodiments it may be configured as a Java/HTTP interface, or may present multiple different types of interfaces for different types of clients. Clients of data store 160, such as ACS 150, may utilize the storage interface API to provide structured data records to be stored and to supply requests or queries through which such records may be selectively retrieved. Managers 161 may also be configured to coordinate features such as the partitioning and replication of data records among hosts 163, as described in detail below.

In some embodiments, each of managers 161 may correspond to any suitable configuration of one or more computer systems or portions of computer systems configured to implement the data store manager functionality described below. In some such embodiments, the computer system or systems configured to implement a given instance of managers 161 may also be configured to implement other functionality, such as operating system functionality or application functionality. In some embodiments, it is contemplated that multiple distinct instance of managers 161 may be implemented by a single instance of a computer system.

Although data store 160 is shown as a single logical entity, in some embodiments, its components may be physically distributed across multiple physical sites. For example, managers 161 and hosts 163 may be distributed across a number of different data centers or computing facilities located in different geographical areas. In some cases, certain instances of managers 161 and hosts 163 may be located within the same facilities as or may share hardware with other elements of the web services architecture illustrated in FIGS. 2A-C. For example, systems configured to implement certain instances of managers 161 or hosts 163 may reside within the same facility as, and may share communication resources with, systems configured to implement ACS 150, web services interface 130, or resources 140. In certain cases, the same system may be configured to implement all or portions of the functionality of any of these components in combination. In some embodiments, at least one instance of manager 161 and possibly some of hosts 163 may be deployed within each installation where an instance of ACS 150 is deployed, or as close as is necessary to ensure the availability of high-bandwidth communication paths between instances of ACS 150 and manager 161. For example, an instance of manager 161 may be located within the same data center as an instance of ACS 150 in order to improve the latency and throughput of communication between the two.

Generally speaking, data store 160 may be configured to store structured data. In one embodiment, such data may include individual records that may include one or more fields, as well as tables that may include one or more records. For example, an ACE 310 as described above may correspond to a structured data record that may be stored by data store 160. Similarly, tables 300 and 600 described above may be examples of tables that may be stored by data store 160, as may any derivatives of such tables that may be used by ACS 150. As previously described, structured data tables may be implemented in a relational fashion in which the interpretation of data fields is a function of position within the table, in a self-describing fashion in which a markup language or other technique may be employed to tag or annotate the meaning of data fields, or using any other suitable implementation. While previous examples have discussed two-dimensional tables having any number of rows and columns, it is noted that in some embodiments, tables stored by data store 160 may have any number of dimensions. Also it is noted that while data store 160 may be configured to store tables relating to access control information on behalf of ACS 150, in some embodiments data store 160 may be deployed independently of ACS 150 and configured to store any type of structured data, regardless of whether such data is related to access control information of web services resources.

In some embodiments, each table stored by data store 160 may have a particular field designated as the partition key. For example, when a table such as table 300 is created within data store 160, the entity on behalf of which the table is created (e.g., ACS 150, a principal 100, or some other entity) may specify a particular field, such as the resource URI field 320, that is to be used as the partition key. The partition key may subsequently be used as the basis for partitioning the table into logical blocks, replicas of which may then be distributed among hosts 163 for storage.

Figure 10:
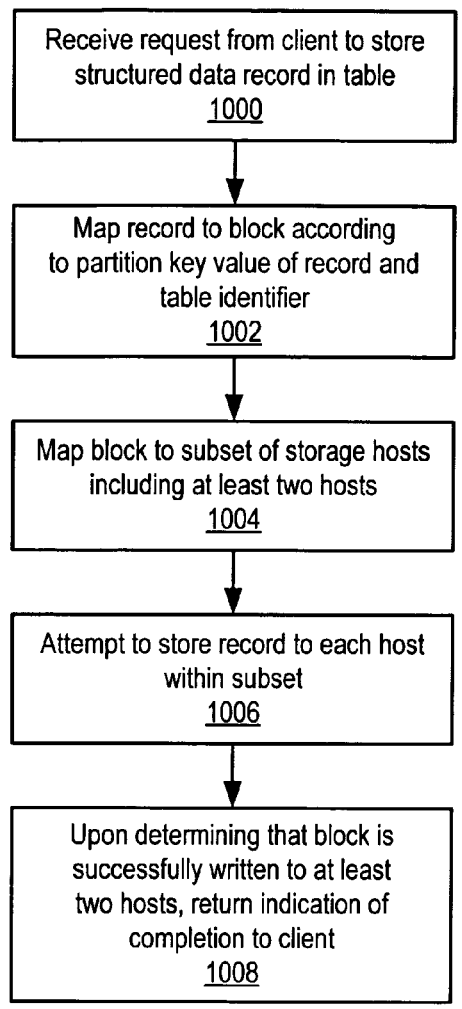
FIG. 10 is a flow diagram illustrating one embodiment of a method of partitioning a table including structured data records for storage within a data store.

One embodiment of a method of partitioning a table for storage that may be employed by data store 160 is illustrated in FIG. 10. Referring collectively to FIGS. 9 and 10, operation begins in block 1000 where an instance of manager 161 receives a request from a client to store a structured data record within a table. For example, such a request may include receiving a request from a client, such as ACS 150, to store an ACE 310 within an existing table 300, or another type of record within another existing table. In another case, such a request may include receiving a request to generate a new table along with multiple records to be stored within the new table.

In some embodiments, each table stored by data store 160 may be associated with a common name (e.g., "ResourceUsersTable") that may be specified by the principal 100 on behalf of which the table was created, as well as an access identifier associated with that principal 100 (e.g., subject pool and principal ID). In some such embodiments, each table may correspond to a particular URL or URI that reflects access identifier and table common name information. For example, such a URL may be formatted as follows:
http://tablestore.host.com/<accessID>/<tablename>
In some embodiments, the principal 100 associated with a table may correspond to an owner of a resource 140 with which the table is associated.

In response to receiving the request, manager 161 may map the structured data record to a block according to a partition key value of the record and an identifier of the table (block 1002). In one embodiment, to determine such a mapping, manager 161 may be configured to apply a hash function to the value of the partition key field of the record to determine a hash value H. The hash function employed may be any suitable function configured to map an arbitrary-length data value to a fixed length data value, such as a version of the Secure Hash Algorithm (e.g., any member of the SHA family of hash functions, such as SHA-1, SHA-256, etc.), the MD5 algorithm, a cyclic redundancy check (CRC) algorithm, or another suitable algorithm. For example, in the case where the record to be stored is an instance of ACE 310 to be stored in table 300 having the resource URI field as its partition key field, the value of the resource URI specified by the instance of ACE 310 may be hashed to determine the hash value H. In some embodiments, data store 160 may be configured to support a fixed maximum number of blocks N over which partitioning may occur. In such embodiments, the hash value may be determined modulo N.

The resulting hash value, modulo any applicable maximum number of blocks, may be referred to as the partition number corresponding to the record. In one embodiment, an identifier of the corresponding block may be determined by combining the partition number with the identifier of the table. For example, if the table identifier corresponds to a URL or URI as described above, the block corresponding to a record may be identified by appending the partition number to the table URI, using any appropriate delimiters. In other embodiments, the block identifier may not include the entire table URI, but may instead include the access identifier of the table owner and/or the common name of the table.

After the structure data record has been mapped to a block, manager 161 may map the block to a subset of storage hosts 163 that includes at least two hosts 163 (block 1004). In some embodiments, this mapping may be performed with respect to a replication factor R that specifies the number of replicas of a block to be stored among hosts 163. As noted previously, hosts 163 may sometimes be distributed among a number of discrete, geographically distributed data centers. In one embodiment, to map the block to a subset of storage hosts 163, manager 161 may be configured to first map the block to a set of data centers, and then map the block to specific hosts 163 within the identified data centers. For example, for a block having a given identifier BID and a set of k data centers having respective identifiers D1, . . . , Dk, manager 161 may be configured to determine a set of k hash values resulting from appending or otherwise combining each data center identifier with the block identifier BID in turn, and computing the hash value for each combination. Manager 161 may then apply a selection criterion to the set of k hash values to select P data centers, where P corresponds to a desired level of replication among data centers. In various embodiments, the selection criterion may include selecting the P largest or smallest hash values, or selecting P hash values according to some other attribute. (The parameters P and R may be default parameters specified by manager 161 for all tables managed by data store 160, or they may be parameters specified by an owner of a particular table for use with that table.)

After selecting the data centers to which replicas of the block will be stored, manager 161 may be configured to map the block to specific hosts within each data center. Such a mapping may be performed in a manner similar to data center selection described above. Specifically, in one embodiment, for a given data center including i hosts 163 having respective identifiers H1, . . . , Hi, manager 161 may be configured to determine a set of i hash values resulting from appending or otherwise combining each host identifier with the block identifier BID in turn, and computing the hash value for each combination. Manager 161 may then apply a selection criterion to the set of i hash values to select Q hosts 163. In some embodiments, if the total number of replicas R is to be distributed evenly across the P data centers, Q may be determined as R/P, rounded to the nearest or next-highest integer. It is noted that in some embodiments, manager 161 may be configured to map the block directly to R hosts 163 without regard for the distribution of the selected hosts 163 among data centers.

Once the block has been mapped to a subset of hosts 163, manager 163 may attempt to store the structured data record to each host 163 within the subset (block 1006). For example, manager 163 may invoke an API presented by each of hosts 163 to convey the record for storage. Upon determining that the block has been successfully stored to at least two hosts 163 within the subset, manager 163 may return to the requesting client an indication that the storage request is complete (block 1008). In some embodiments, manager 163 may be configured to wait indefinitely for writes to complete to a minimum number of hosts 163 (which may be other than two). In other embodiments, manager 163 may time out if the minimum number of block writes has not occurred after a particular length of time.

It is noted that in some embodiments, the same mapping process as described above with respect to blocks 1002-1004 for storing records to a table may be employed for table reads. That is, given a request to read records corresponding to some partition key value from a table, a similar mapping process may be used to determine the blocks and hosts 163 where the records may be found, if they exist.

As described in greater detail below with respect to the configuration and operation of hosts 163, mapping of tables to blocks may facilitate the replication of blocks across hosts 163, thereby decreasing the likelihood that the failure of certain ones of hosts 163 will result in data loss. Partitioning of a table into multiple blocks prior to mapping the blocks to hosts 163 may also more evenly distribute the workload associated with maintaining the contents of the table. If a number of tables were to be stored in their entirety on respective hosts 163 without block-level partitioning, certain hosts 163 may become saturated with access requests while others may remain relatively idle, depending on how frequently their respective tables are accessed. By contrast, if more-frequently and less-frequently-accessed tables are distributed across a set of hosts 163, there may be less variation in resource utilization among those hosts 163, which may result in improved overall performance of data store 160.

As described above, data store 160 may generally support the creation and storage of tables that include structured data records, the addition and removal of records to and from existing tables, and the retrieval of records from tables. For example, in one embodiment the API of data store 160 exposed via managers 161 may support the operations CreateTable, DeleteTable, InsertRecord, DeleteRecord, ReadRecords, and ListTables, or a similar set of operations.

In one embodiment, the CreateTable may take as parameters the name of the table to be created (e.g., the common name of the table and the access identifier of the corresponding principal 100), a schema defining the structure of the table (e.g., describing the fields comprising a record of the table) and an identifier of the particular record field to be used as the partition key for the table. To implement the CreateTable operation, a manager 161 may be configured to validate the provided schema, for example by parsing the schema to ensure that it is syntactically correct and verifying that the specified partition key is included in the schema.

In some embodiments, data store 160 may maintain an internal table configured to store information about all of the tables stored by data store 160 on behalf of clients. Each record of this User Table Information table may correspond to a client-provided table and may include such information as, for example, the identifier of the table, the table schema, the access identifier of the principal 100 corresponding to the table. In some embodiments, the record may also include fields indicating whether the table is a dataview (described below), the name of the dataview (if applicable), and/or whether the table is flagged as having been deleted. As described below in conjunction with the description of hosts 163, the User Table Information table may be several types of metadata managed by data store 160. In some embodiments, a copy of each metadata table such as the User Table Information table may be stored without partitioning to every host 163. That is; each host 163 may store a complete copy of metadata tables, unlike client tables which may be partitioned as described above. In other embodiments, certain metadata tables may be partitioned while other may not.

In embodiments where a User Table Information table is implemented, in processing the CreateTable operation a manager 161 may be further configured to generate an appropriate record for the new table within the User Table Information table. Upon successful completion of the CreateTable operation, the manager 161 may be configured to return to the requesting client a URI or another type of identifier uniquely corresponding to the created table.

The DeleteTable operation, in one embodiment, may be configured to take as a parameter the identifier of the table to be deleted. The identifier may be specified as a URI or in any other suitable format that unambiguously identifies the table. To implement the DeleteTable operation, a manager 161 may be configured to identify those hosts 163 to which the table is mapped (e.g., according to the block mapping procedure described above) and to instruct those hosts 163 to delete records associated with the table. In some embodiments, the manager 161 may also be configured to mark the specified table as deleted within a corresponding entry within the User Table Information table, or to delete the corresponding entry entirely.

The InsertRecord operation, in one embodiment, may be configured to take as parameters the identifier of the table into which a record is to be inserted as well as the record data to insert. To implement the InsertRecord operation, a manager 161 may be configured to map the record to a block and a set of hosts 163 according to the partition key value of the record, for example as described above with respect to FIG. 10.

In one embodiment, the DeleteRecord and ReadRecords operations may each be configured to take as parameters the identifier of a table, a value of the primary key for the table, and a matching expression. To implement these operations, a manager 161 may be configured to map the primary key value to a corresponding block and set of hosts 163, for example according to the partitioning algorithm described above. For the DeleteRecord operation, manager 161 may then supply the matching expression to the each of the identified hosts 163, In some embodiments, to process the ReadRecords operation, manager 161 may arbitrarily or randomly select one of the identified hosts 163 for reading, while in other embodiments manager 161 may convey the ReadRecords operation to several or all of the identified hosts 163 and accept the results from the first host 163 to respond.

For a given one of the identified hosts 163 that receives either operation, if the given host 163 stores any records corresponding to the primary key value that also satisfy the matching expression, it may delete those records (in the case of the DeleteRecord operation) or return them to manager 161 to be returned to the requesting client (in the case of the ReadRecords operation). Generally speaking, the matching expression may correspond to a search pattern or query formulated in any suitable query language supported by hosts 163. For example, the matching expression may simply include a list of keywords to be matched within a record. Alternatively, the matching expression may include a complex query including operators, regular expressions, wildcard patterns or other syntactic elements supported by a query language such as, e.g., MySQL query language, XQuery language, or another suitable query language. In some embodiments, if a ReadRecords operation fails to complete on the selected host 163, manager 161 may be configured to select a different one of the hosts 163 corresponding to the mapped block.

The ListTables operation, in one embodiment, may take as a parameter an access identifier corresponding to a principal 100. To implement the ListTables operation, in one embodiment a manager 161 may be configured to identify those tables stored within data store 160 for which the identified principal 100 is the indicated creator or owner. For example, manager 161 may be configured to search the User Table Information table using the provided access identifier to identify any corresponding entries. If any matching entries are found, manager 161 may return the URIs of corresponding tables as indicated within the entries to the requesting entity as a result of the ListTables operation.

In some embodiments of data store 160 in which tables are partitioned according to the value of a partition key field, as described above, an operation to query for and retrieve records that satisfy a matching expression (e.g., the ReadRecords operation) may require that a value for the partition key be specified as part of the query. That is, because the partition key field may be a primary determinant of how a table is distributed among hosts 163 and indexed within a host 163, retrieval of records may be dependent upon specifying a partition key value. For example, if the resource URI field 320 is designated as the partition key field of table 300, it may be possible to query for a particular value of resource URI, or any combination of the resource URI field and one or more of principal ID field 330, subject pool 340 and/or access type 350. However, with resource URI as the partition key, it may not be possible to query table 300 for entries 310 for which principal ID alone matches some value (i.e., in which the resource URI is not specified).

In order to support queries on fields of a table other than the designated partition key, in one embodiment data store 160 may support the generation and maintenance of dataviews. Generally speaking, a dataview of a table is itself a table that may store the same data according to the same general schema as the table. However, the dataview may be partitioned according to a different field than the table from which it is derived.

One example of a table and a corresponding dataview is illustrated in FIG. 11. In the illustrated embodiment, resource table 300 is shown to have four records as entries, indexed in order according to the resource URI field, which corresponds to the partition key for table 300. As shown, dataview 300a has the same data content as table 300. However, the records of dataview 300a are indexed in order according to the principal ID field, which corresponds to the partition key for dataview 300a. Thus, while table 300 may be organized specifically for queries involving the resource URI field, dataview 300a may allow queries involving the principal ID field, thus enabling a different perspective or view into the same data.

Generally speaking, for a table including structured data records having N distinct fields, as many as N−1 dataviews may be defined corresponding to the table. In one embodiment, the data store API supported by managers 161 may include CreateDataview and DeleteDataview operations in addition to the above-described operations for managing tables. In one embodiment, the CreateDataview operation may take as parameters the identifier of a table from which the dataview is to be derived, the name to be associated with the generated dataview, and the partition key to be used in generating the dataview. To implement the CreateDataview operation, a manager 161 may be configured to coordinate with hosts 163 to retrieve the records corresponding to the specified table, to partition the records according to the specified partition key, and to store the partitioned records to hosts 163 (e.g., as described above with respect to the InsertRecord operation). Manager 161 may also return to the requesting client a unique identifier, such as a URI, corresponding to the generated dataview. In some embodiments, manager 161 may also be configured to add an entry corresponding to the new dataview to the User Table Information table, indicating within the entry the identifier of the table from which the dataview is derived.

In one embodiment, the DeleteDataview operation may take as a parameter the identifier of a dataview to be deleted. The DeleteDataview operation may be implemented by managers 161 in a manner similar to the DeleteTable operation described above. In some embodiments, if a table has corresponding dataviews, performing the DeleteTable operation on the table may result in deletion of all corresponding dataviews.

Generally speaking, dataviews of a table may be partitioned and stored among hosts 163 in the same manner as any other table. However, in some embodiments the contents of dataviews may not be updated directly by managers 161. Instead, as described in greater detail below, hosts 163 may be configured to coordinate among themselves to update dataviews of a given table in response to a manager 161 updating the state of the given table.

Although one embodiment of data store 160 and its constituent components has been described as a repository for web services resource access control information, data store 160 is not limited to use in such contexts. It is contemplated that in some embodiments, data store 160 may itself be configured as a web services resource configured to store structured data records in a distributed, replicated fashion and to retrieve such records in response to queries. For example, in one embodiment the above-described storage API exposed by managers 161 may be configured as a web services API, and managers 161 may correspond to addressable web services endpoints with which clients (e.g., clients 110) may interact to store and retrieve structured data records.

Storage Host Configuration

Figure 12:
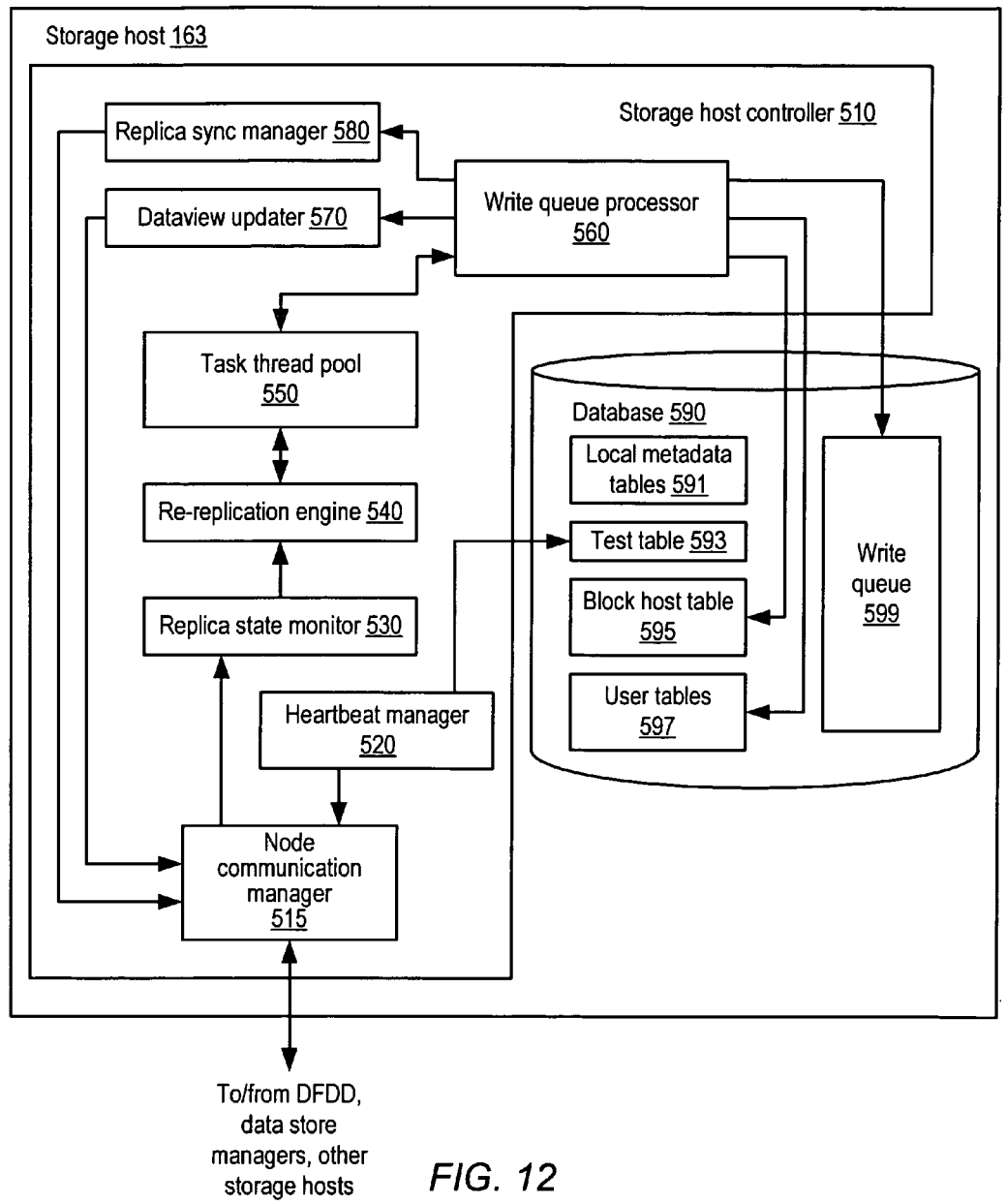
FIG. 12 is a block diagram illustrating one embodiment of a storage host.

In some embodiments, each storage host 163 may be implemented as a distinct system configured to perform a variety of tasks related to storage and retrieval of structured data records, as well as replica synchronization and failure recovery. One embodiment illustrating a particular configuration of a storage host 163 is shown in FIG. 12. In the illustrated embodiment, storage host 163 includes a storage host controller 510, configured to implement various aspects of host management and operation, and a database 590 configured to store structured data records (e.g., as blocks of table data) as well as relevant metadata.

Figure 18:
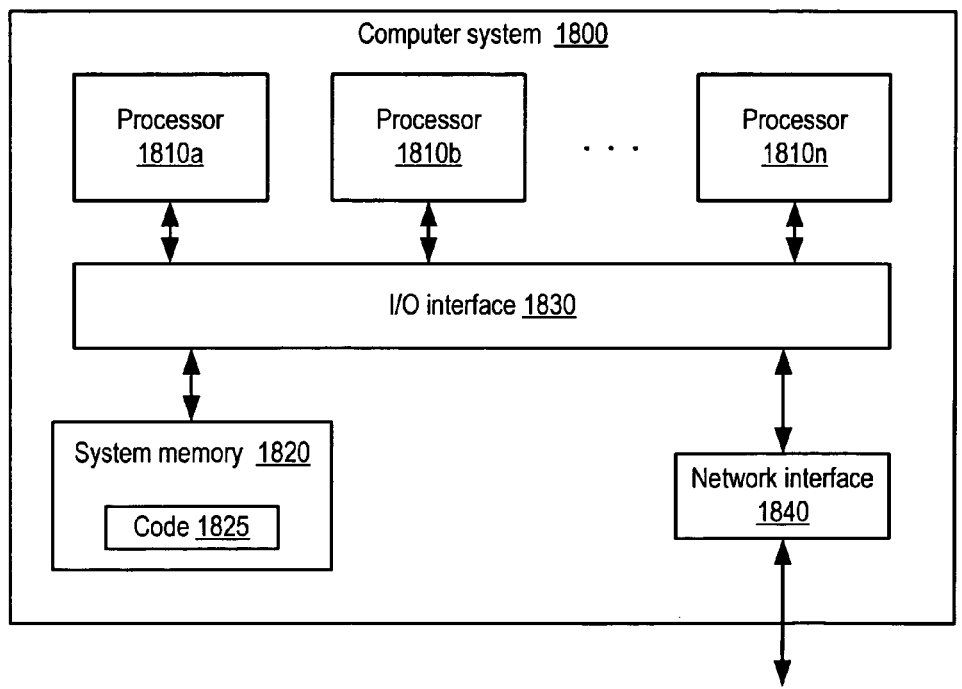
FIG. 18 is a block diagram illustrating an exemplary computer system.

It is noted that in some embodiments, storage host 163 may denote one or more computer systems configured to implement the various illustrated functional components of host 163, such as the computer system illustrated in FIG. 18. For example, any of the illustrated components may be implemented directly or indirectly via instructions stored on a computer-accessible medium and executable by a processor to perform the tasks of the component. In some embodiments, the various elements of storage host 163 may be partitioned in any suitable way across multiple distinct computer systems. It is also contemplated that in some embodiments, the system(s) configured to implement the illustrated components of host 163 may also implement other components not shown. Additionally, in some embodiments, the illustrated components may be implemented as corresponding software modules, such as modules coded in Java or another suitable language. However, in other embodiments it is contemplated that the illustrated components may be partitioned into a different arrangement of software modules. For example, illustrated components may be partially or completely combined or divided in ways other than those illustrated.

Storage host controller 510 (or simply, controller 510) may implement a variety of distinct functions or modules variously configured to communicate with one another. In the illustrated embodiment, controller 510 includes a node communication manager 515, which may be configured to receive information from a heartbeat manager 520 and to communicate with a replica state monitor 530, which in turn may communicate with a re-replication engine 540. Both re-replication engine 540 and a write queue processor 560 may be configured to communicate with a task thread pool 550. Write queue processor 560 may be configured to communicate with a dataview updater 570 and a replica synchronization manager 580 as well as with database 590.

Node communication manager 515 may generally be configured to manage various types of data communications between storage host 163 and other entities, such as data store managers 161, DFDD 165, and other hosts 163. In various embodiments, node communication manager 515 may expose aspects of the storage host 163 API via suitable synchronous or asynchronous protocols. For example, manager 515 may implement HTTP-based messaging protocols for communication of host status information with other nodes and/or DFDD 165. In some embodiments, node communication manager 515 may implement a JDBC endpoint configured for receiving and processing data operations received from managers 161, such as data queries and requests to store data, for example. In other embodiments, node communication manager 515 may implement one or more web services endpoints through which the various functions supported by host 163 may be invoked. Manager 515 may implement any suitable combination of these or other types of communication techniques or protocols.

Generally speaking, heartbeat manager 520 may be configured to monitor and report the overall operational health of host 163. In the illustrated embodiment, heartbeat manager 520 may be configured to periodically attempt to perform a data query on test table 593 stored within database 590. If the query succeeds, heartbeat manager 520 may generate a heartbeat message to be conveyed to the DFDD instance 165 associated with host 163 (e.g., via node communication manager 515). As described below, DFDD 165 may be configured to determine whether a given host 163 has become inoperative dependent upon whether heartbeat messages expected from the given host 163 have actually been received.

In the illustrated embodiment, replica state monitor 530 may be configured to listen for operational state change messages of other hosts 163 that may be collectively detected and communicated throughout data store 160 by instances of DFDD 165. For example, if another host 163 transitions to a failed state, the state change may be published by DFDD 165 and detected by replica state monitor 530. In response, replica state monitor 530 may be configured to work in concert with re-replication engine 540 to generate additional replicas as needed on one or more other hosts 163 of blocks of structured data records stored by database 590, in order to ensure that a minimum level of replication of blocks is preserved despite the host failure. Failure detection and re-replication are discussed in greater detail in a subsequent section.

Host 163 may receive many different types of data processing requests from different sources for concurrent processing. For example, host 163 may receive numerous requests to read and write records from managers 161 on behalf of clients of data store 160. Additionally, host 163 may receive requests to read or write records from other hosts 163 in order to synchronize tables, update dataviews, or re-replicate blocks. In one embodiment, each such request to access data stored in database 590 or that requires the action of another component of host 163 may be assigned to a thread for processing, and task thread pool 550 may be configured to coordinate and manage the processing of outstanding threads. For example, task thread pool 550 may be configured to prioritize and schedule thread execution, to perform resource leveling to ensure that more resource-intensive threads do not starve other threads, and/or to perform any other tasks necessary or useful for managing the workflow of host 163.

As described in greater detail below in conjunction with the general description of storage host write operation, when requests to store record data are received by host 163, in the illustrated embodiment the requests may be written into write queue 599 for eventual commitment to an appropriate table within database 590. In one embodiment, write queue processor 560 may be configured to actively manage the process of completing write activity. For example, write queue processor 560 may be configured to monitor write queue 599 and to attempt to drive pending write operations to completion (e.g., to drain the queue). If a table that is the object of a record write or delete operation has corresponding dataviews, write queue processor 560 may coordinate with dataview updater 570 to generate the appropriate write operations needed to update the dataviews and to communicate those operations to the hosts 163 to which the dataviews are mapped. Additionally, when a write operation to a block of a table stored by host 163 is processed, write queue processor 560 may coordinate with replica sync manager 580 to generate appropriate write operations to ensure that replicas of the modified block mapped to other hosts 163 are also updated, so that the replicas may be synchronized with respect to the write activity. It is noted that although write queue 599 may be implemented as a data structure within database 590 as shown in FIG. 12, in other embodiments write queue 599 may be implemented separately from database 590 within a host 163. For example, write queue 599 may be implemented within a region of a system memory, where the region is managed by write queue processor 560.

Database 590 may correspond to any suitable type of database configured to store tables including structured data records. In one embodiment, database 590 may be implemented as a MySQL database, although any other open-source or commercial database product may be employed. In various embodiments, database 590 may be configured to store structured data as relational tables, as self-describing data records (e.g., XML records), or in any other appropriate format. In some instances, when storing a record having a particular structure or schema, database 590 may internally transform or remap the record into a different representation, while preserving the integrity of the data relationships defined by the schema. For example, to optimize query performance, database 590 may be configured to construct indexes of stored records by sorting, hashing, or recoding various records or fields of records.

In addition to the write queue table 599 mentioned above, in the illustrated embodiment database 590 may be configured to store local metadata tables 591, a test table 593, a block host table 595, and user tables 597. In the illustrated embodiment, user tables 597 may be configured to store the structured data records of the tables defined by clients of data store 160, as mapped to blocks and hosts 163 by managers 161. As described above, test table 593 may include one or more records storing test data that may be periodically queried by heartbeat manager 520 to assess the operational status of database 590 and host 163. In some embodiments, test table 593 may not be visible to entities external to host 163.

In one embodiment, local metadata tables 591 may be configured to store one or more tables including various types of metadata about the user tables 597 stored on host 163, as well as other information about host 163. For example, in embodiments where the User Table Information table described above is not partitioned among multiple hosts 163, local metadata tables 591 may store a copy of this table. Local metadata tables 591 may also include one or more of a Local Blocks table and a Local Host Information table. In one embodiment, the Local Blocks table may include records identifying all of the blocks stored by host 163. These records may identify blocks by their global identifiers, as determined by a partitioning and mapping process such as described above with respect to managers 161. In some embodiments, host 163 may additionally identify locally stored blocks using a locally-defined identifier, such as a running index incremented each time a new block is stored. If a local block identifier is supported, the association between local identifiers and corresponding global identifiers may be reflected in the records stored by the Local Blocks table.

The Local Host Information table may, in one embodiment, be configured to store identifying and/or configuration data about host 163. For example, the Local Host Information table may be configured to store a globally unique identifier corresponding to host 163, such as a URI or string. Configuration information that may be stored by the Local Host Information table may include information about versions of software and/or hardware comprising host 163, host resource capacity information (e.g., total storage, memory and/or processing capacity implemented by host 163), host resource utilization information (e.g., resource utilization statistics over time), or any other suitable configuration information.

In one embodiment, block host table 595 may be configured to store records identifying, for a given block of records stored by host 163, the other hosts 163 within data store 160 that store replicas of the given block. For example, block host table 595 may store records including a local or global identifier of a block as well as the global identifiers of each host 163 to which the block has been mapped for storage. In some embodiments, when storing a record to a block replicated by several hosts 163, manager 161 may be configured to convey to each of the several hosts 163 a list including identifying information of each host 163.

As described above with respect to FIG. 10, to implement an operation to store a structured data record within data store 160, in one embodiment a manager 161 may be configured to map the record to a block and map the resulting block to a group of hosts 163. Manager 161 may then be configured to issue a request to write the record to each of the group of hosts 163. One embodiment of a method of operation of a host 163 to store a structured data record is illustrated in FIG. 13.

Figure 13:
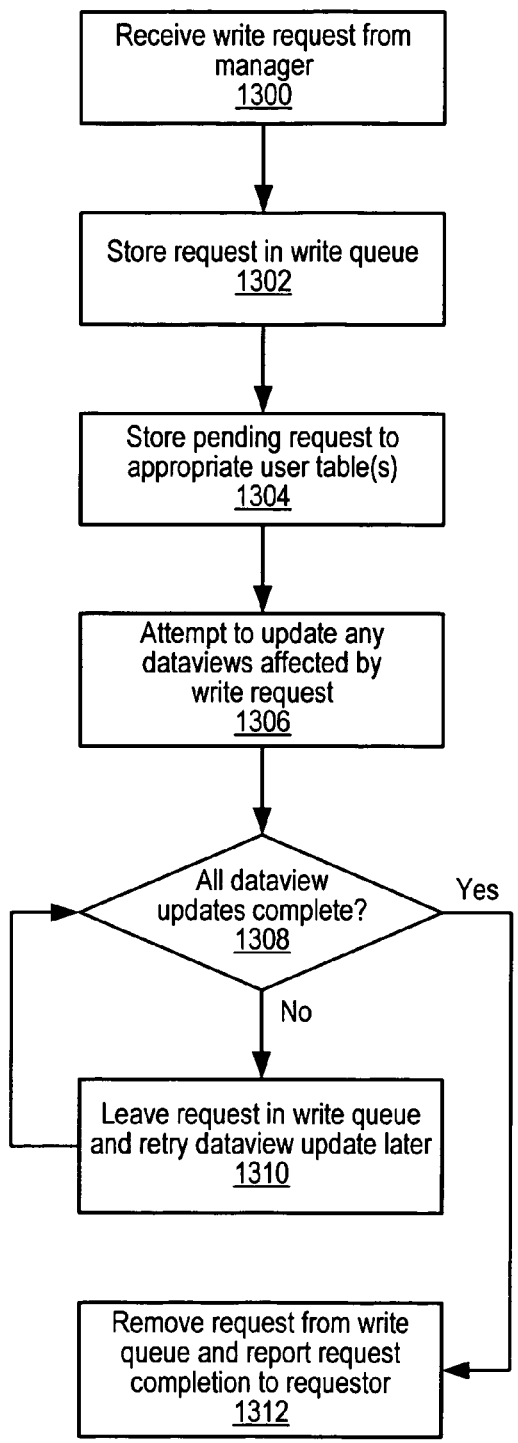
FIG. 13 is a flow diagram illustrating one embodiment of a method of operation of a storage host to store a structured data record.

Referring collectively to FIGS. 12 and 13, operation begins in block 1300 where a host 163 receives a write request from a manager 161, for example via a web services or other type of communication API presented by node communication manager 515. In one embodiment, the received write request may include a number of fields or parameters, including a record identifier, a timestamp value, a table identifier, a block identifier, a list of hosts to which the write request has been conveyed, and the actual record data to be stored, although it is contemplated that in other embodiments, the write request may include more, fewer or different parameters.

The record identifier may correspond to a unique or probabilistically unique identifier of the record to be written, such as a hash value of some or all of the fields of the record, which may be determined by manager 161 according to a suitable hash algorithm. The timestamp value may be assigned to the write request by manager 161 and may reflect the time at which the corresponding write operation was received by manager 161, or any other point in time during the processing of the write operation. In one embodiment, for a given operation to store a structured data record to multiple hosts 163, the same timestamp value may be consistently assigned to each write request conveyed to the multiple hosts 163. Such consistency may enable the hosts 163 to properly coordinate and synchronize their record updates.

The table identifier included in the write request may correspond to the identifier originally provided to manager 161 to identify the table in which the structured data record should be stored. As described above, the table identifier may include a URI or other data sufficient to uniquely identify the table to be written, such as an access identifier of the table owner, for example. The block identifier and list of hosts 163 may correspond to the results of the block and host mapping process described above with respect to FIG. 10. For example, block and host identifiers may be formatted as URIs or as other types of unambiguous identifiers.

Once host 163 receives a write request, the request may be stored within write queue 599 (block 1302). For example, after being received via node communication manager 515, a thread may be assigned to the write request and the request may be inserted within write queue 599. In some embodiments, once the write request is stored within write queue 599, the write request may be reported to the requesting manager 161 as complete, even though the request may not have been fully committed to (e.g., persistently stored within) the corresponding user tables 597. In such embodiments, reporting completion of write requests prior to full commitment of those writes may improve the processing latency of write requests. For example, if a client requests a write of a structured data record blocks or stalls until the write is complete, earlier completion may result in earlier resumption of the client's activity. In some such embodiments, however, write requests may not be immediately visible to subsequent read requests.

Subsequently, the storage host controller 510 may examine write queue 599 and store the pending write request to the appropriate one(s) of user tables 597 (block 1304). For example, write queue processor 560 may be configured to periodically poll write queue 599 and transfer pending write requests to their targeted tables. Additionally, the storage host controller 510 may attempt to update any dataviews affected by the write request (block 1306). For example, write queue processor 560 may coordinate with dataview updater 570 to determine whether the table targeted by the write request has any dataviews, and if so, to generate additional write requests to update those dataviews. The additional write requests may then be conveyed to the hosts 163 associated with the dataview block to be updated, for example as indicated by block host table 595.

The storage host controller 510 may monitor any pending dataview updates to determine whether all dataview updates have successfully completed (block 1308). For example, write queue processor 560 may be configured to wait for an indication of success from each of the hosts 163 to which additional write requests to update dataviews were conveyed. If any pending dataview update is not yet completed, the original write request is left within write queue 599 and the pending dataview update is retried at a later time (block 1310). If all pending dataview updates have completed, the storage host controller 510 may remove the write request from write queue 599 and report successful completion of the request to the requestor (block 1312).

In some embodiments, host 163 may limit the number of attempts made to update a dataview, for example by timing out after a certain number of attempts have been made or a certain period of time has elapsed since the first attempt. If the limit is exceeded, in one embodiment host 163 may report a failure of the original write request and, in some cases, may attempt to reverse the status of any completed writes to user tables 597 that resulted from the original write request. In another embodiment, host 163 may be configured to initiate re-replication of the dataview to one or more other hosts 163, as described in greater detail below.

When writing a structured data record within database 590, in some embodiments host 163 may be configured to augment the data record with additional fields configured to store metadata associated with the data record. In one embodiment, each record stored by a host 163 may be augmented with a record identifier, a delete flag, and a timestamp value. For example, as illustrated in FIG. 14, records of table 300 of FIG. 11 may be augmented with fields including a record identifier field 360, a delete flag field 370, and a timestamp field 380. In one embodiment, when storing a record in response to a write request from a manager 161, host 163 may be configured to insert a record identifier supplied by the manager 161 (e.g., a hash value of the record or a particular field of the record) within the record identifier field. In some embodiments, host 163 may be configured to use the record identifier field to sort, organize or access records within database 590. Like the record identifier, in one embodiment the timestamp field stored within a record may be derived from a timestamp value provided by manager 161 within the record write request.

In some embodiments, when an existing structured data record stored by host 163 is updated (e.g., as a result of a write request) or deleted, the existing record may not be updated or deleted. Instead, in the case of an update, host 163 may generate and store a new copy of the record reflecting the update. In cases where the record identifier of the existing record is the same as that of the updated record, the timestamp value may be used to distinguish the copies. For example, host 163 may be configured to select the record having the most recent timestamp when performing a query operation that matches multiple versions of a record. In the case of a delete operation performed on a record, host 163 may be configured to assert the delete flag field of the record, otherwise leaving the record intact. In such an embodiment, host 163 may be configured to ignore records with asserted delete flag fields when performing queries or other operations on records.

Retaining old records following update or delete operations may simplify synchronization operations when hosts 163 become divergent in the state of their stored records. For example, it may be possible for hosts 163 to collectively reverse the effects of a series of update or delete operations on a record in order to restore that record to a consistent state. In some embodiments, hosts 163 may be configured to permanently remove old versions of records and/or deleted records and reclaim associated storage at various intervals. For example, hosts 163 may purge old or deleted records after a certain period of time elapses since the timestamp of the record, or in the case of updated records after a certain number of subsequent updates have occurred.

One example of a table stored by a host 163 that includes previous versions of records and deleted records is illustrated in FIG. 15. In the illustrated embodiment of table 300, three records are shown corresponding to the resource ID "URI C." Collectively, these three records illustrate an original version of the record as well as the effects of two update operations to that record. At timestamp 265983, the original version of the record reflected a principal ID of "James," a subject pool of "Customer" and an access type of "Read." At timestamp 329649, the record was updated to reflect a change in the principal ID to "John." At timestamp 610273, the record was updated to reflect a change in the access type to "Write." This record denotes the most current version of the record. Also in the illustrated embodiment, two records are shown corresponding to the resource ID "URI E." At timestamp 3920, the record reflected a principal ID of "Frank," a subject pool of "Customer," an access type of "Read" and a deasserted delete flag field. At timestamp 11520, the record was deleted, and its delete flag field was asserted.

Data Replication, Synchronization and Fault Recovery

As described above, in one embodiment of data store 160, the structured data records included in tables may be partitioned among blocks that may in turn be replicated across hosts 163 in a distributed fashion. Storing multiple replicas of the structured data records may generally increase data reliability and availability, as the likelihood of concurrent failure of all replicas may be relatively small. In some circumstances, distributing replicated table data may also increase the performance of clients that store and retrieve that data. For example, if replicas are distributed among hosts 163 in different data centers or geographic locations, the distance between a given client and the closest replica of desired data may be less than if the replicas were not distributed. In some circumstances, decreased distance may result in a higher bandwidth or lower latency communication path between the client and a host 163, which may result in faster access to structured data records.

In a distributed, replicated system such as data store 160, various circumstances may cause replicas of data to have divergent or inconsistent values. A manager 161 may initiate write requests to update a block stored on a number of different hosts 163, but some of the write requests may fail to complete, for example, because of transient or permanent failures in communication between the manager 161 and one or more hosts 163, or failure on the part of a host 163 itself. Independent of write request activity, one or more hosts 163 may fail catastrophically, due to hardware or infrastructure failure, for example. Any of these or other scenarios may result in inconsistencies among data replicas.

Figure 16A:
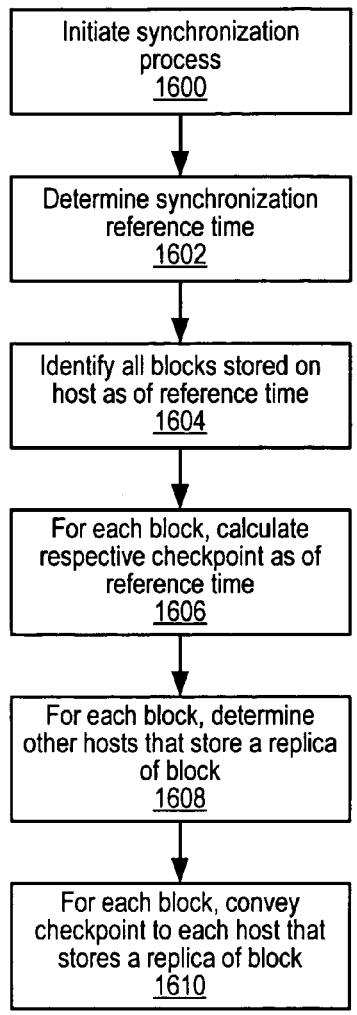
FIGS. 16A-B are flow diagrams illustrating one embodiment of a method of synchronizing replicas of blocks among storage hosts.
Figure 16B:
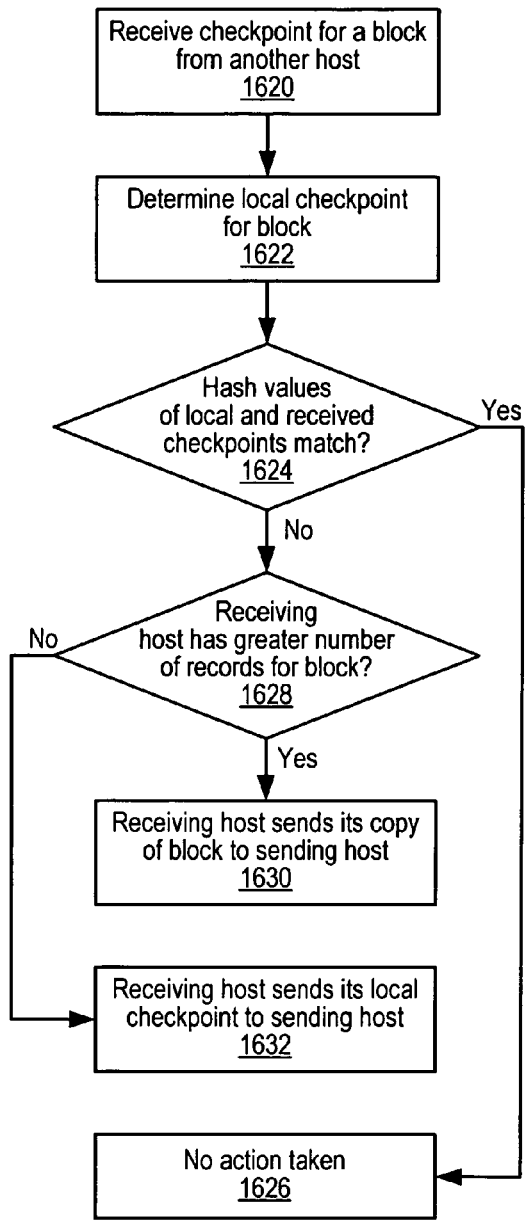

In one embodiment, hosts 163 may be configured to exchange synchronization information with one another to synchronize the state of blocks replicated among the hosts. One embodiment of a method of operation of such a synchronization procedure is illustrated in FIGS. 16A-B. Referring first to FIG. 16A, operation begins in block 1600 when a given host 163 initiates the synchronization process. For example, hosts 163 may be configured to execute the process at periodic intervals, in response to receiving write request activity, or in response to other triggers.

Once the process is initiated, host 163 may determine a reference time T for performing synchronization (block 1602). For example, replica sync manager 580 may be configured to determine the current time as of the initiation of synchronization. The reference time may be formatted in the same manner as the timestamps reflected in the structured data records stored by database 590.

Host 163 may then identify all of the blocks stored on the host as of the reference time T (block 1604). For example, replica sync manager 580 may be configured to query the Local Blocks table stored within local metadata tables 591 to identify the blocks stored by host 163.

For each identified block, host 163 may calculate a respective checkpoint of the block as of reference time T (block 1606). For example, replica sync manager 580 may be configured to compute a hash value for each block, taking into account each of the structured data records stored within the block (e.g., by concatenating the records and computing a hash value of the concatenation). Any suitable hash algorithm may be employed, such as any suitable length version of the Secure Hash Algorithm, for example. The checkpoint of a block may include the hash value of the block, taken together with the reference time T. In some embodiments, the checkpoint may also include an indication of the number of records included in the block and a global identifier corresponding to the block. For example, the checkpoint may be implemented as a structured data record having various fields that correspond to the different information components of the checkpoint.

For each identified block, host 163 may determine the set of other hosts 163 that store a replica of the block (block 1608). For example, replica sync manager 580 may be configured to query block host table 595 using a local identifier of a given block to identify other hosts 163 corresponding to the block. Host 163 may then convey the checkpoint for each block to each host 163 that stores a replica of the block (block 1610). For example, replica sync manager 580 may coordinate with node communication manager 515 to convey messages including the checkpoint to other hosts 163.

One embodiment of a method of processing a received checkpoint is illustrated in FIG. 16B. In the illustrated embodiment, operation begins in block 1620 where a checkpoint is received by a host 163 from another host. The receiving host 163 may then compute its own local checkpoint for its replica of the identified block (block 1622). In one embodiment, replica sync manager 580 may be configured to compute a hash value of the identified block in the same manner as described above with respect to FIG. 16A. However, in one embodiment, the hash value may take into account only those records having a corresponding timestamp that is not later than the reference timestamp T, as indicated in the received checkpoint. For example, replica sync manager 580 may be configured to disregard those records with timestamps greater than T. In some embodiments, restricting synchronization relative to a reference timestamp may decrease pathological execution behavior such as thrashing or oscillating among hosts 163, particularly in dynamic contexts where record data changes frequently.

If the hash value determined by the receiving host 163 matches the hash value in the received checkpoint, no action may be taken (blocks 1624-1626). In this instance, the block in question may already be synchronized with respect to both hosts as of the reference timestamp T. If the hash values differ, the receiving host 163 may determine whether it has a greater number of records for the block than the host 163 that sent the checkpoint, as indicated in the received checkpoint (block 1628). If so, the receiving host 163 may send the entire contents of its replica of the identified block to the host 163 that sent the checkpoint (block 1630). In this instance, the replicas may be out of synchronization and the receiving host 163 may have a more current version of the block, as indicated by the record count. Thus, the receiving host 163 may send its version of the block to the initiating host 163, which may replace its version with the more current version.

If the receiving host 163 does not have a greater number of records for the block than the initiating host 163, the receiving host may convey its checkpoint, reflecting its number of records for the block, back to the initiating host 163 (block 1632). In one embodiment, this may result in the initiating host 163 and the receiving host 163 swapping roles with respect to execution of the illustrated method. It is noted that in some embodiments, a host 163 may perform the methods of FIGS. 16A-B concurrently, for example with respect to different blocks of records.

The synchronization process just described, or a suitable variant, may in many cases be sufficient to reconcile the variations in block state that may arise due to varying latency in communication of write requests among hosts 163, transient failures resulting in missed or dropped write requests, or similar issues. However, in some circumstances a host 163 may become completely unresponsive for a significant length of time, and it may be necessary to generate additional replicas of the record data stored by the failed host.

In one embodiment, instances of DFDD 165 may collectively operate to track the operating state information of each of the hosts 163 within data store 160. As shown in FIG. 9, an instance of DFDD 165 may be provisioned for each host 163, although in other embodiments a single DFDD 165 instance may be configured to monitor the state of more than one host 163.

In some embodiments, DFDD 165 may maintain global state information for individual hosts 163 that may indicate in general terms whether a given host 163 is operating normally or is in an abnormal state. As described above, the heartbeat manager 520 of a given host 163 may be configured to report the operational status of the host to DFDD 165 by conveying a heartbeat message, or simply "heartbeat." Such reports may often (but not necessarily) be generated at regular intervals such as some number of seconds or minutes. Heartbeat reports may be communicated according to any suitable protocol (e.g., as TCP/IP messages, as web services calls, or according to other standard or proprietary messaging protocols) and may vary in information content. In one embodiment, the heartbeat may simply include an indication of the unique identifier corresponding to the given host 163 and possibly a timestamp, while in other embodiments the heartbeat message may include more comprehensive status information, such as performance or resource utilization statistics, for example.

Figure 17:
FIG. 17 illustrates one embodiment of a state machine configured for tracking the operational state of a storage host.

Generally speaking, if a host 163 is sending heartbeats to DFDD 165 as expected, there is a reasonable expectation that the host is operating normally. If heartbeats should be interrupted for some length of time, there is a reasonable expectation that something is wrong with the host. FIG. 17 illustrates one embodiment of a global state machine that may be maintained by DFDD 165 for each host 163 as a function of heartbeat activity and/or other parameters. In the illustrated embodiment, a host 163 from which heartbeats are being received regularly is designated as being in the ACTIVE state. A host 163 may remain in the ACTIVE state as long as the time elapsed since the instance's last heartbeat to DFDD 165 is less than a failure threshold $T_{fail}$. For example, DFDD 165 may maintain a counter for each host 163 that it monitors, and may increment a particular counter upon each heartbeat received from the corresponding host 163. DFDD 165 may monitor each counter (e.g., with countdown timers) to ascertain whether its value changes before $T_{fail}$ elapses.

If time $T_{fail}$ has elapsed since the last heartbeat for a host 163, its global state may transition to INCOMMUNICADO.

In the illustrated embodiment, INCOMMUNICADO may function as a transient state indicative that something may be wrong with the host, but it has not been definitively determined to have permanently failed. For example, the host 163 may have temporarily stalled or hung, the heartbeat message to DFDD 165 may have gotten delayed or lost, or one instance of DFDD 165 may be out of synchronization with another instance of DFDD 165 with respect to the current state of the host. If a heartbeat is received from a host 163 in the INCOMMUNICADO state, the host may transition back to the ACTIVE state.

If a host 163 does not spontaneously recover from the INCOMMUNICADO state, there may be a more serious problem affecting the instance. In the illustrated embodiment, a host 163 that is determined to have permanently failed may transition to the DEAD state. In some embodiments, this transition may be initiated upon the intervention of an administrator or other agent, for example based on the outcome of an effort to diagnose the problem with the host. In other embodiments, DFDD 165 may be configured to perform this transition automatically, for example based on heuristics or other decision criteria such as the length of time the host 163 has been in the INCOMMUNICADO state, efforts to contact other nearby hosts, or other suitable criteria. In the illustrated embodiment, once a host 163 enters the DEAD state, it cannot recover. If the host 163 is to be redeployed after being diagnosed and repaired, it may be initialized and introduced to data store 160 as a new host that contains no data.

When an instance of DFDD 165 detects a change in state associated with a host 163, it may operate to propagate the state change to other instances of DFDD 165. In one embodiment, DFDD 165 may employ a broadcast protocol to broadcast host state changes to all other DFDD instances. For example, each instance of DFDD 165 may correspond to a well-known HTTP port at a network address of a corresponding host 163, such that a DFDD instance 165 may simply broadcast host state changes to all known hosts at the well-known port. In other embodiments, different protocols may be employed to propagate and reconcile host state information among instances of DFDD 165. For example, gossip-based protocols may be employed, in which one DFDD instance selects one or more other instances at random with which to exchange host state information. Provided DFDD instances perform the gossip-based protocol relatively frequently, the overall host state reflected by all of the DFDD instances may remain highly consistent without the communication overhead associated with a broadcast protocol.

An instance of DFDD 165 that detects a state change may also operate to communicate the state change to one or more hosts 163, such as the hosts that instance is configured to monitor. In some embodiments, a host 163 may receive notification of any state change that occurs with respect to any other host 163, while in other embodiments DFDD 165 may support a publish/subscribe or other selective notification model through which a host 163 may request to receive state change notifications only for a specified set of other hosts 163.

The replica state monitor 530 of each host 163 may generally be configured to monitor for host state changes received from DFDD 165. In one embodiment, if replica state monitor 530 of a given host 163 detects that another, recovered host 163 has transitioned from INCOMMUNICADO to ACTIVE, re-replication engine 540 may responsively be configured to convey to the recovered host 163 copies of those blocks of records that are replicated by both hosts 163. For example, re-replication engine 540 may be configured to query block host table 595 to determine which, if any blocks stored by the given host 163 are also stored by the recovered host 163. Since the recovered host 163 may not reflect any changes to these blocks made while the recovered host 163 was in the INCOMMUNICADO state, the given host's version of these blocks may be more current than the recovered host's, and may therefore be suitable for resynchronizing the recovered host.

Similar re-replication may occur in the event a host 163 permanently fails. In one embodiment, if replica state monitor 530 of a given host 163 detects that another, failed host 163 has transitioned from INCOMMUNICADO to DEAD, re-replication engine 540 may responsively be configured to identify those blocks of the given host 163 that had been replicated by the failed host 163. Re-replication engine 163 may then be configured to select a new host 163 to store the replicas previously stored by the failed host 163. For example, re-replication engine 163 may be configured to perform a version of the block-to-host mapping algorithm described above with respect to FIG. 10, with the modification that the failed host 163 may be excluded from the set of hosts 163 to which blocks may be mapped. Once a new host 163 has been selected, re-replication engine 163 may be configured to generate replicas of the identified blocks to the new host 163.

As noted above, when a given host 163 transitions from a temporarily failed operating state to a normal operating state or a permanently failed operating state, blocks stored by the given host 163 may be synchronized with respect to other hosts 163 or re-replicated on other hosts 163, as appropriate. Such re-replication may happen unconditionally in response to a state transition, where replicas are directly conveyed to the given host 163 or a different host 163. However, in other embodiments re-replication may occur as a special case of a synchronization process employed among hosts 163, such as the process described above with respect to FIGS. 16A-B. For example, in response to detecting that a given host 163 has recovered to a normal operating state, other hosts 163 may initiate synchronization with the given host 163 by conveying checkpoints to the given host 163 for those blocks replicated by the given host 163. Through the operation of the synchronization protocol, differences between the given host 163 and other hosts 163 may be reconciled.

Similarly, if a given host 163 permanently fails, blocks that were replicated by the given host 163 may be remapped to other hosts 163, for example through hosts 163 or manager 161 executing the block mapping procedure described above with respect to FIG. 10. When one or more new hosts 163 have been identified, other hosts 163 may initiate synchronization with the new host(s) 163 with respect to the blocks to be replicated, for example by conveying block checkpoints in a manner similar to that described above. Generally speaking, synchronizing blocks among hosts may encompass execution of a checkpoint-based synchronization procedure as described above, unconditional forwarding of a replica from one host to another host, or any other suitable synchronization procedure.

As described above with respect to FIG. 10, in one embodiment the mapping of blocks to hosts 163 may depend on the available set of hosts 163 across which blocks may be mapped. For example, depending on the behavior of the hash function that may be used to map blocks to hosts 163, adding or deleting hosts 163 from the set of hosts 163 used in the mapping process may result in a given block being mapped to a substantially different subset of hosts 163 than prior to the adding or deleting. In some embodiments, hosts 163 and/or managers 161 may be configured to remap some or all blocks to hosts 163 subsequent to a host 163 being added to or deleted from data store 160. For example, a manager 161 may be configured to read existing blocks and then store them again, applying the method of FIG. 10 with respect to the newly configured set of hosts 163. Such remapping may result in redistribution of blocks among hosts 163. In some embodiments, such remapping may occur in response to a change in composition of hosts 163 (e.g., in response to a state change of a host 163), while in other embodiments, such remapping may occur at intervals of time or in response to some other event.

It is noted that in some embodiments, the illustrated instances of DFDD 165 may correspond to one or more systems configured to implement the above-described functionality. In other embodiments, DFDD 165 may be implemented as a software module or process executable on a system that implements other functionality. DFDD instances may typically be deployed on systems that are independent of the hosts 163 the instances are configured to monitor. However, in some embodiments it is contemplated that an instance of DFDD 165 may be implemented by a host 163 other than the host(s) the instance is configured to monitor. Additionally, in some embodiments more sophisticated instances of DFDD 165 may be configured to perform monitoring and state notification within complex distributed systems that may include the functionality of data store 160 as well as other functionality. Examples of such embodiments are described in U.S. Provisional Patent Application No. 60/754,726, entitled "Distributed Storage System With Web Services Client Interface" and filed on Dec. 29, 2005, which is hereby incorporated by reference in its entirety. It is noted that in some embodiments, the methods and techniques for managing access control information and storing structured data records as described herein may be used in conjunction with the methods and techniques described in the incorporated reference.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of web services client 110, web services interface 130, web services resources 140, access control service 150, data store manager 161, DFDD 165, and any of the elements of storage host 163, as well as the methods illustrated in FIGS. 4, 5, 8, 10, 13, 16A, 16B or any suitable variations or portions thereof. Such program instructions may also be executed to perform computational functions in support of the methods and techniques described above, for example to instantiate operating system functionality, application functionality, and/or any other suitable functions.

One exemplary embodiment of a computer system including computer-accessible media is illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830. In some embodiments, it is contemplated that inventory management system 50 may be implemented using a single instance of computer system 1800, while in other embodiments multiple such systems may be configured to host different portions or instances of inventory management system 50. For example, in one embodiment some data sources or services (e.g., purchasing management services) may be implemented via instances of computer system 1800 that are distinct from those instances implementing other data sources or services (e.g., order entry/fulfillment services). It is noted that in some embodiments, the functions of inventory management system 50 as variously described hereinabove may be partitioned in any suitable fashion into a number of distinct modules, procedures or other functional portions. The resulting portions of inventory management system 50 may then be implemented as a unified or distributed system among one or several instances of computer system 1800, for example as instructions executable by one or more of processors 1810.

In various embodiments computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments processors 1810 may be a general-purpose or embedded processor implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

System memory 1820 may be configured to store instructions and data accessible by process 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1820 as code 1825.

In one embodiment, I/O interface 1830 may be configured to coordinate I/O traffic between processor 1810, system memory 1820, and any peripheral devices in the device, including network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network, such as other computer systems, for example. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1820 may be one embodiment of a computer-accessible medium configured to store program instructions and data as described above. However, in other embodiments, program instructions and/or data may be received, sent or stored upon different types of computer-accessible media. Generally speaking, a computer-accessible medium or storage medium may include mass storage media or memory media such as magnetic or optical media, e.g., disk or CD/DVD-ROM coupled to computer system 1800 via I/O interface 1830. A computer-accessible medium may also include any volatile or non-volatile media such as RAM (e.g. SDRAM, DDR SDRAM, RDRAM, SRAM, etc.), ROM, etc, that may be included in some embodiments of computer system 1800 as system memory 1820 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
    one or more computers configured to provide a web service via a web services interface, wherein the web service is accessible via the interface to create a plurality of different web services resources for a plurality of different owners, wherein each web services resource is accessible via the interface;
    a storage medium configured to store instructions; and
    one or more processors configured to access said storage medium, wherein said instructions are executable by at least one of said one or more processors to implement a web services access control system, wherein said web services access control system is configured to:
        provide access control for owners of web services resources to specify access control rights for the owners' respective web services resources;
        receive, via the web services interface, grant requests from different owners of different web services resources accessible via the web service to grant different access types to different principals for the different web services resources of the respective owners;
        in response to receiving said grant requests, generate in a data store an access control entry for each request that corresponds to a principal, a resource, and an access type specified in the grant request;
        receive requests from different principals via the web services interface, wherein each request specifies one or more access operations to be performed;
        for each received request:
            identify a web services resource;
            identify a principal; and
            determine whether an access control entry exists in said data store that comprises:
                a resource identifier matching said web services resource identified;
                a principal identifier matching said principal identified; and
                an access type identifying one or more access types sufficient to perform said one or more access operations specified by said received request; and
            based at least in part on a determination that said access control entry does not exist for a given received request, deny said given received request.

2. The system as recited in claim 1, wherein a given one of said requests is submitted by one of one or more web services clients on behalf of a principal corresponding to said given received request.

3. The system as recited in claim 1, wherein a given one of said requests is received by said web services access control system via a web services interface.

4. The system as recited in claim 1, wherein a given one of said requests corresponding to a particular web services resource is received by said web services access control system from said particular web services resource.

5. The system as recited in claim 1, wherein to determine whether said access control entry exists, said web services access control system is further configured to submit a query to said data store.

6. The system as recited in claim 5, wherein said data store comprises:
    a plurality of storage hosts each configured to store and retrieve structured data records, wherein said structured data records include said access control entries; and
    a data store manager configured to:
        receive a request from said web services access control system to store a structured data record;
        in response to receiving said request, map said structured data record to a block according to a partition key value of said structured data record;
        map said block to a subset comprising at least two of said plurality of storage hosts; and
        upon successfully storing said structured data record to said block within at least two storage hosts within said subset, return to said web services access control system an indication that said request is complete.

7. The system as recited in claim 5, wherein a given one of said plurality of access control entries specifies a resource identifier of a given one of said resources, an access identifier of a given one of said one or more principals, and one or more access types.

8. The system as recited in claim 7, wherein said resource identifier includes a Uniform Resource Indicator (URI) corresponding to said given web services resource.

9. The system as recited in claim 7, wherein said access identifier includes an indication of a principal identifier and an indication of a particular one of one or more subject pools within which said principal identifier is defined.

10. The system as recited in claim 1, wherein said web services access control system is further configured to:
    receive a grant request to grant a particular access type to a given one of said principals for a given one of said resources, wherein said grant request is submitted on behalf of an owner of said given resource; and
    in response to receiving said grant request, generate an access control entry that corresponds to said given principal and said given resource, and that specifies said particular access type.

11. The system as recited in claim 1, wherein said web services access control system is further configured to:
    receive a revoke request to revoke a particular access type from a given one of said principals for a given one of said resources, wherein said revoke request is submitted on behalf of an owner of said given resource; and
    in response to receiving said revoke request, delete an access control entry that corresponds to said given principal and said given resource, and that specifies said particular access type.

12. The system as recited in claim 1, wherein said web services resource corresponding to said received request is configured as a child of a parent web services resource, and wherein to determine whether said access control entry exists, said web services access control system is further configured to determine whether an access control entry exists that corresponds to said parent web services resource and said identified principal, and that specifies one or more access types, wherein said one or more access types are sufficient to perform said one or more access operations specified by said received request.

13. The system as recited in claim 1, wherein to determine whether an access control entry exists, said web services access control system is further configured to:
   determine whether said principal is a member of a group of principals; and
   in response to determining that said principal is a member of said group, determine whether an access control entry exists that is associated with both said web services resource corresponding to said received request and said group, and that specifies one or more access types, wherein said one or more access types of the respective access control entry are sufficient to perform said one or more access operations specified by said received request.

14. The system as recited in claim 13, wherein membership information of said group is implemented as a web services resource.

15. The system as recited in claim 1, wherein a given one of said requests is received as a command formatted according to a version of Hypertext Transfer Protocol (HTTP), wherein parameters of said given request are formatted as components of said command.

16. The system as recited in claim 1, wherein a given one of said requests is received as a document formatted according to a version of eXtensible Markup Language (XML), wherein parameters of said given request are formatted as elements included in said document.

17. The system as recited in claim 16, wherein said document is encapsulated according to a version of SOAP protocol or Simple Object Access Protocol.

18. The system as recited in claim 1, wherein the web services interface is further configured to:
   receive a given one of said requests;
   receive credential information indicating an identity of a principal corresponding to said given request;
   attempt to authenticate said credential information; and
   in response to successfully authenticating said credential information, forward said given request to said web services access control system.

19. A method, comprising:
   providing a web service via a web services interface, wherein the web service is accessible via the interface to host a plurality of different web services resources for a plurality of different owners, wherein each web services resource is accessible via the interface;
   providing access control for owners of web services resources to specify access control rights for the owners' respective web services resources;
   receiving, via the web services interface, grant requests from different owners of different web services resources accessible via the web service to grant different access types to different principals for the different web services resources of the respective owners;
   in response to receiving said grant requests, generating in a data store an access control entry for each request that corresponds to a principal, a resource, and an access type specified in the grant request;
   receiving requests from different principals via the web services interface, wherein each request specifies one or more access operations to be performed;
   for each received request;
      identify a web services resource;
      identify a principal; and
      determining, using a computer, whether an access control entry exists in the data store that comprises:
         a resource identifier matching said web services resource identified;
         a principal identifier matching said principal identified; and
         an access type identifying one or more access types sufficient to perform said one or more access operations specified by said received request,
      wherein said data store comprises a plurality of access control entries, each entry comprising:
         a resource identifier identifying a particular resource to be accessed;
         a principal identifier uniquely identifying a principal; and
         an access type identifying one or more access types indicative of one or more access types allowed by the associated principal to the particular resource; and
      based at least in part on a determination that said access control entry does not exist for a given received request, denying said given received request.

20. The method as recited in claim 19, wherein a given one of said requests is submitted by one of one or more web services clients on behalf of a principal corresponding to said given received request.

21. The method as recited in claim 19, wherein receiving a given one of said requests comprises receiving said given request via a web services interface.

22. The method as recited in claim 19, wherein receiving a given one of said requests corresponding to a particular web services resource comprises receiving said given request from said particular web services resource.

23. The method as recited in claim 19, wherein determining whether said access control entry exists further comprises submitting a query to said data store.

24. The method as recited in claim 23, further comprising submitting to said data store a request to store a structured data record including one of said access control entries, wherein said data store is further configured to:
   in response to receiving said request, map said structured data record to a block according to a partition key value of said structured data record;
   map said block to a subset comprising at least two of a plurality of storage hosts; and
   upon successfully storing said structured data record to said block within at least two storage hosts within said subset, return an indication that said request is complete.

25. The method as recited in claim 24, wherein a given one of said plurality of access control entries specifies a resource identifier of a given one of said resources, an access identifier of a given one of said one or more principals, and one or more access types.

26. The method as recited in claim 25, wherein said resource identifier includes a Uniform Resource Indicator (URI) corresponding to said given web services resource.

27. The method as recited in claim 25, wherein said access identifier includes an indication of a principal identifier and an indication of a particular one of one or more subject pools within which said principal identifier is defined.

28. The method as recited in claim 19, further comprising:
receiving a grant request to grant a particular access type to a given one of said principals for a given one of said resources, wherein said request is submitted on behalf of an owner of said given resource; and
in response to receiving said grant request, generating an access control entry that corresponds to said given principal and said given resource, and that specifies said particular access type.

29. The method as recited in claim 19, further comprising:
receiving a revoke request to revoke a particular access type from a given one of said principals for a given one of said resources, wherein said request is submitted on behalf of an owner of said given resource; and
in response to receiving said revoke request, deleting an access control entry that corresponds to said given principal and said given resource, and that specifies said particular access type.

30. The method as recited in claim 19, wherein said web services resource corresponding to said received request is configured as a child of a parent web services resource, and wherein determining whether said access control entry exists further comprises determining whether an access control entry exists that corresponds to said parent web services resource and said identified principal, and that specifies one or more access types, wherein said one or more access types are sufficient to perform said one or more access operations specified by said received request.

31. The method as recited in claim 19, wherein determining whether an access control entry exists further comprises:
determining whether said principal is a member of a group of principals; and
in response to determining that said principal is a member of said group, determining whether an access control entry exists that is associated with both said web services resource corresponding to said received request and said group, and that specifies one or more access types, wherein said one or more access types of the respective access control entry are sufficient to perform said one or more access operations specified by said received request.

32. The method as recited in claim 31, wherein membership information of said group is implemented as a web services resource.

33. The method as recited in claim 19, further comprising receiving a given one of said requests as a command formatted according to a version of Hypertext Transfer Protocol (HTTP), wherein parameters of said given request are formatted as components of said command.

34. The method as recited in claim 19, further comprising receiving a given one of said requests as a document formatted according to a version of eXtensible Markup Language (XML), wherein parameters of said given request are formatted as elements included in said document.

35. The method as recited in claim 34, wherein said document is encapsulated according to a version of SOAP protocol or Simple Object Access Protocol.

36. The method as recited in claim 19, further comprising:
receiving credential information indicating an identity of a principal corresponding to a given one of said requests; and
attempting to authenticate said credential information;
wherein said determining whether an access control entry exists is dependent upon successfully authenticating said credential information.

37. A system, comprising:
a web services interface configured to receive a web services request from a web services client, wherein said web services request specifies:
a principal;
a web services resource; and
an access operation,
wherein said access operation is requested to be performed with respect to said web services resource on behalf of said principal;
a data store comprising a plurality of access control entries each comprising:
a resource identifier identifying a particular resource to be accessed;
a principal identifier uniquely identifying a principal; and
an access type identifying one or more access types allowed by the associated principal to the particular resource; and
a web services access control system comprising one or more computers configured to:
provide access control for the owners of network resources to specify access control rights for the owners' respective resources;
receive, via the web services interface, grant requests from different owners of different network resources to grant different access types to different principals for the different resources of the respective owners;
in response to receiving said grant requests, generate in the data store an access control entry for each request that corresponds to a principal, a resource, and an access type specified in the grant request;
receive said web services request from said web services interface;
in response to receiving said web services request, access said data store to determine whether said principal has sufficient access privileges to perform said access operation with respect to said web services resource; and
return an indication to said web services client of whether or not said principal has sufficient access privileges to perform said access operation with respect to said web services resource.

38. The system as recited in claim 37, wherein to determine whether said principal has sufficient access privileges to perform said access operation with respect to said web services resource, said web services access control system is further configured to:
determine whether an access control entry exists in said data store that comprises:
a resource identifier matching said web services resource corresponding to said received web services request;
a principal identifier matching said corresponding principal associated with said received web services request; and
an access type identifying one or more access types sufficient to perform said access operation with respect to said web services resource;
determine that said principal has sufficient access privileges to perform said access operation based on a determination that said access control entry exists; and
determine that said principal does not have sufficient access privileges to perform said access operation based on a determination that said access control entry does not exist.

39. The system as recited in claim 38, wherein to determine whether said access control entry exists, said web services access control system is further configured to submit a query to said data store configured to store a plurality of access control entries.

40. The system as recited in claim 39, wherein said data store comprises:
 a plurality of storage hosts each configured to store and retrieve structured data records, wherein said structured data records include said access control entries; and
 a data store manager configured to:
  receive a request from said web services access control system to store a structured data record;
  in response to receiving said request, map said structured data record to a block according to a partition key value of said structured data record;
  map said block to a subset comprising at least two of said plurality of storage hosts; and
  upon successfully storing said structured data record to said block within at least two storage hosts within said subset, return to said web services access control system an indication that said request is complete.

41. The system as recited in claim 37, wherein said web services access control system is further configured to:
 receive, via said web services interface, a grant request to grant a particular access type to said principal for said web services resource, wherein said grant request is submitted on behalf of an owner of said web services resource; and
 in response to receiving said grant request, generate an access control entry that corresponds to said principal and said web services resource, and that specifies said particular access type.

42. The system as recited in claim 37, wherein said web services access control system is further configured to:
 receive, via said web services interface, a revoke request to revoke a particular access type from said principal for said web services resource, wherein said revoke request is submitted on behalf of an owner of said web services resource; and
 in response to receiving said revoke request, delete an access control entry that corresponds to said principal and said web services resource, and that specifies said particular access type.

43. A method, comprising:
 providing, via a web services interface, access control for owners of network resources to specify access control rights for the owners' respective resources;
 receive, via the web services interface, grant requests from different owners of different network resources to grant different access types to different principals for the different resources of the respective owners;
 in response to receiving said grant requests, generate in a data store an access control entry for each request that corresponds to a principal, a resource, and an access type specified in the grant request;
 receiving, via the web services interface, a web services request from a web services client, wherein said web services request specifies:
  a principal;
  a web services resource; and
  an access operation,
   wherein said access operation is requested to be performed with respect to said web services resource on behalf of said principal;
 in response to receiving said web services request, a computer accessing the data store for determining whether said principal has sufficient access privileges to perform said access operation with respect to said web services resource, wherein said data store comprises a plurality of access control entries, each entry comprising:
  a resource identifier identifying a particular resource to be accessed;
  a principal identifier uniquely identifying a principal corresponding to at least one uniquely identifiable entity; and
  an access type identifying one or more access types allowed by the associated principal to the particular resource; and
 returning an indication to said web services client of whether or not said principal has sufficient access privileges to perform said access operation with respect to said web services resource.

44. The method as recited in claim 43, wherein determining whether said principal has sufficient access privileges to perform said access operation with respect to said web services resource further comprises:
 determining whether an access control entry exists in said data store that comprises:
  a resource identifier matching said web services resource;
  a principal identifier matching said principal; and
  an access type identifying one or more access types sufficient to perform said access operation with respect to said web services resource;
 determining that said principal has sufficient access privileges to perform said access operation based on a determination that said access control entry exists; and
 determining that said principal does not have sufficient access privileges to perform said access operation based on a determination that said access control entry does not exist.

45. The method as recited in claim 44, wherein determining whether said access control entry exists further comprises submitting a query to said data store configured to store a plurality of access control entries.

46. The method as recited in claim 45, further comprising submitting to said data store a request to store a structured data record including one of said access control entries, wherein said data store is further configured to:
 in response to receiving said request, map said structured data record to a block according to a partition key value of said structured data record;
 map said block to a subset comprising at least two of a plurality of storage hosts; and
 upon successfully storing said structured data record to said block within at least two storage hosts within said subset, return an indication that said request is complete.

47. The method as recited in claim 43, further comprising:
 receiving, via a web services interface, a grant request to grant a particular access type to said principal for said web services resource, wherein said grant request is submitted on behalf of an owner of said web services resource; and
 in response to receiving said grant request, generating an access control entry that corresponds to said principal and said web services resource, and that specifies said particular access type.

48. The method as recited in claim 43, further comprising:
 receiving, via a web services interface, a revoke request to revoke a particular access type from said principal for said web services resource, wherein said revoke request is submitted on behalf of an owner of said web services resource; and
 in response to receiving said revoke request, deleting an access control entry that corresponds to said principal and said web services resource, and that specifies said particular access type.

* * * * *